Figure 1:
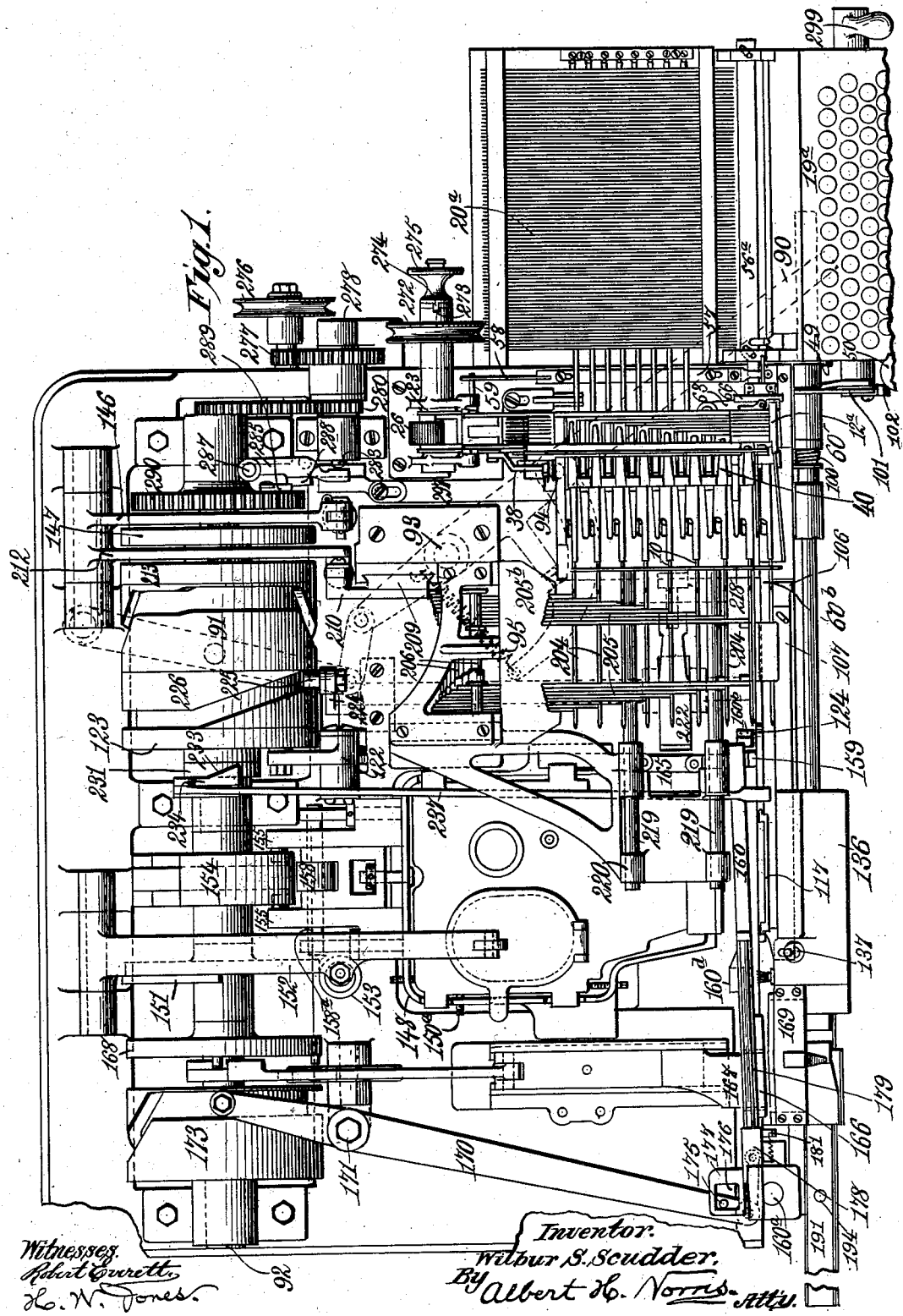

(No Model.) 21 Sheets—Sheet 1.

W. S. SCUDDER.
MONOLINE COMPOSING MACHINE.

No. 605,141. Patented June 7, 1898.

Witnesses.
Robert Everett.
H. W. Jones.

Inventor.
Wilbur S. Scudder.
By Albert H. Norris, Atty.

(No Model.) 21 Sheets—Sheet 2.

W. S. SCUDDER.
MONOLINE COMPOSING MACHINE.

No. 605,141. Patented June 7, 1898.

Witnesses.
Robert Everett.
H. W. Jones.

Inventor.
Wilbur S. Scudder.
By Albert H. Norris.
Atty.

(No Model.) 21 Sheets—Sheet 3.

W. S. SCUDDER.
MONOLINE COMPOSING MACHINE.

No. 605,141. Patented June 7, 1898.

Witnesses.
Robert Orriett
H. W. Jones

Inventor
Wilbur S. Scudder.
By Albert H. Norris
Atty.

(No Model.)  21 Sheets—Sheet 4.
W. S. SCUDDER.
MONOLINE COMPOSING MACHINE.
No. 605,141. Patented June 7, 1898.
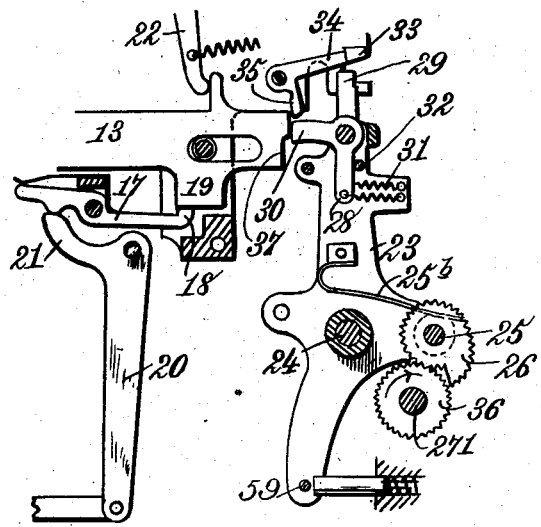
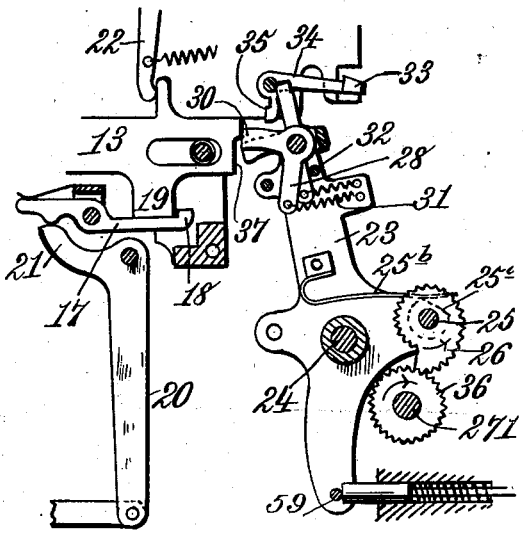
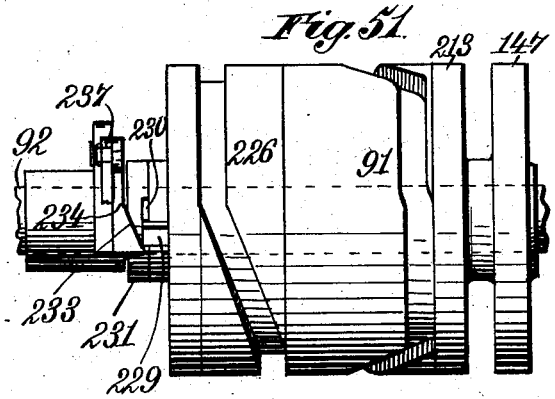
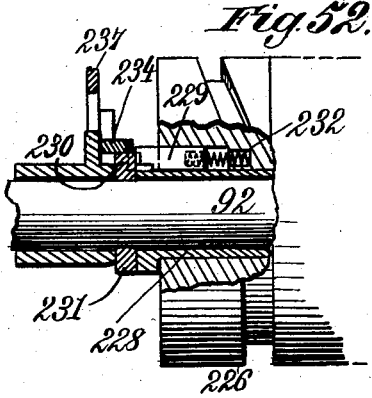
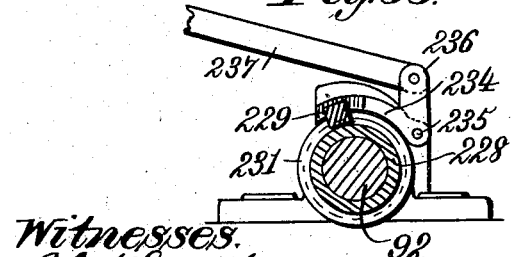
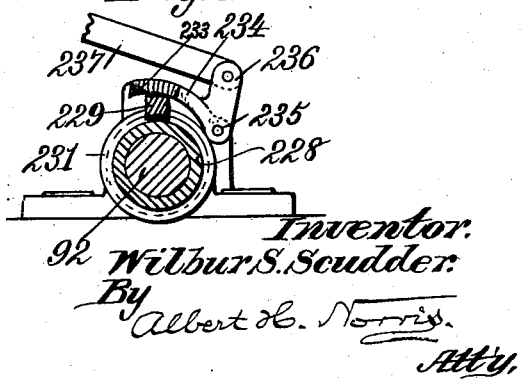
Witnesses.
Robert Everett.
H. W. Jones.
Inventor.
Wilbur S. Scudder.
By Albert H. Norris.
Att'y.

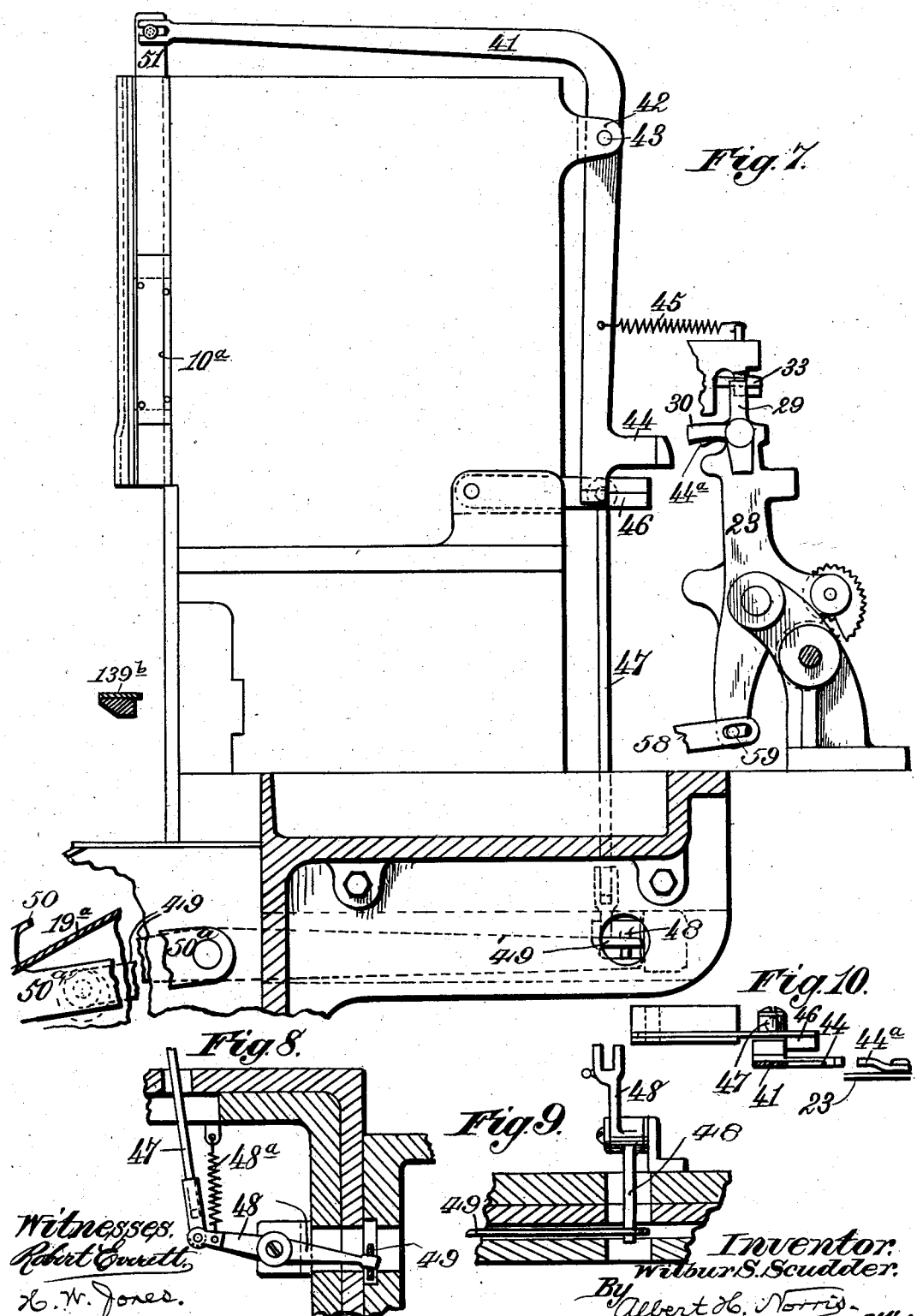

(No Model.) 21 Sheets—Sheet 6.
W. S. SCUDDER.
MONOLINE COMPOSING MACHINE.
No. 605,141. Patented June 7, 1898.
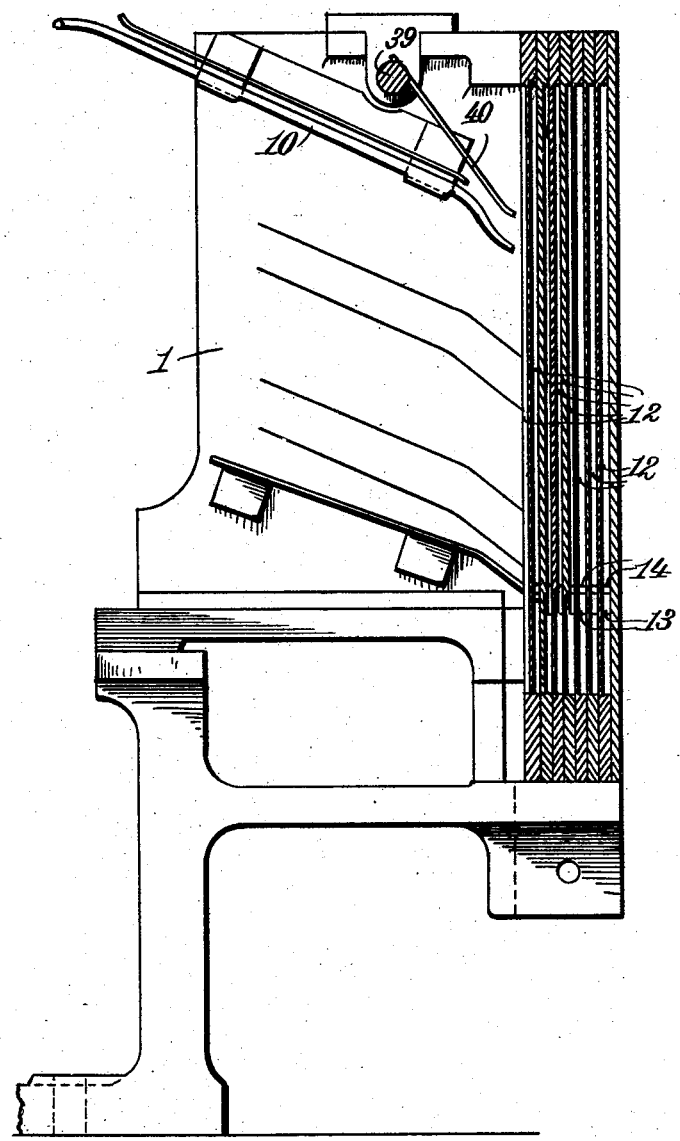
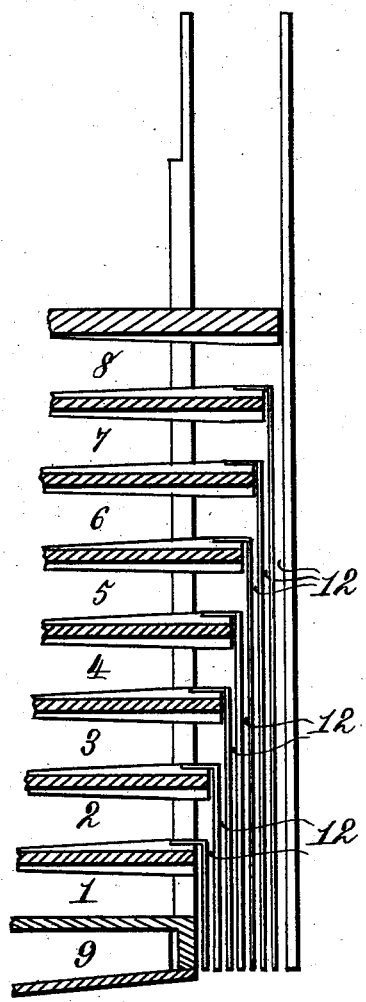
Witnesses.
Robert Everitt,
H. W. Jones.
Inventor.
Wilbur S. Scudder.
By Albert H. Norris.
Atty.

(No Model.) 21 Sheets—Sheet 7.
W. S. SCUDDER.
MONOLINE COMPOSING MACHINE.
No. 605,141. Patented June 7, 1898.
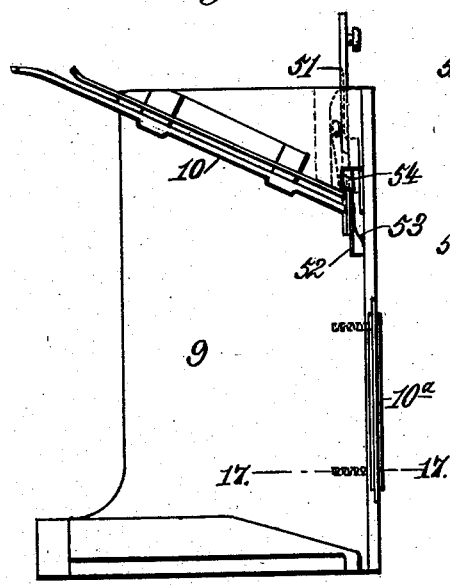
Fig. 13.
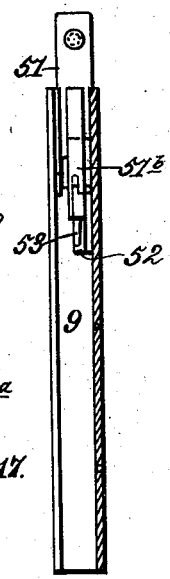
Fig. 14.
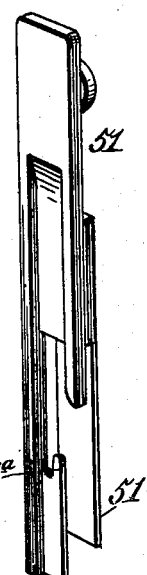
Fig. 15.
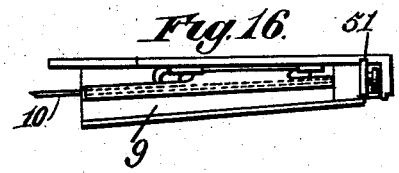
Fig. 16.
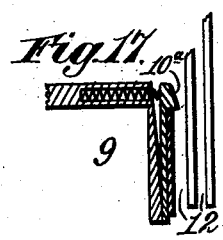
Fig. 17.
Fig. 21.
Fig. 22.
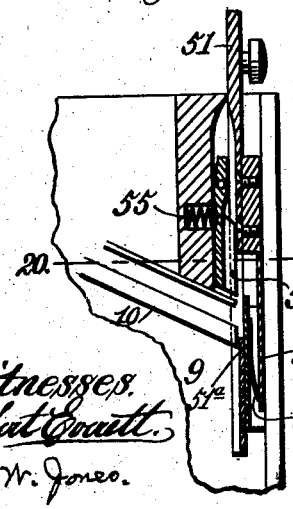
Fig. 18.
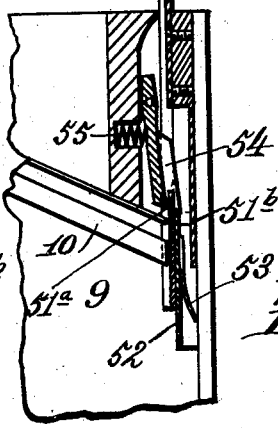
Fig. 19.
Fig. 20.
Witnesses.
Robert Pratt.
H. W. Jones.
Inventor:
Wilbur S. Scudder.
By Albert H. Norris,
Atty.

(No Model.)
W. S. SCUDDER.
MONOLINE COMPOSING MACHINE.
No. 605,141. Patented June 7, 1898.
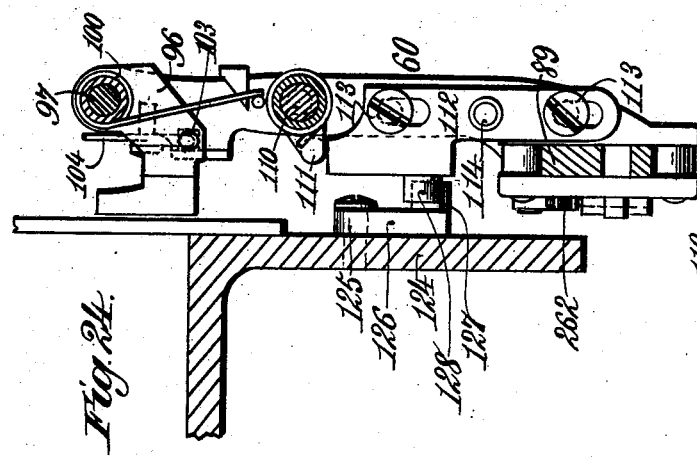
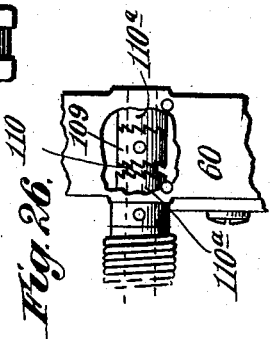
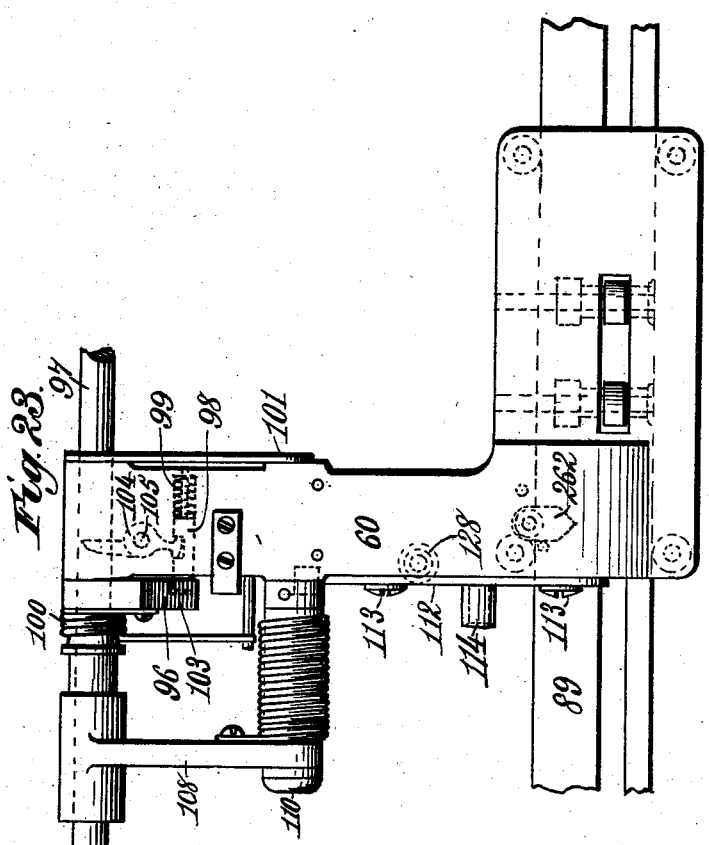
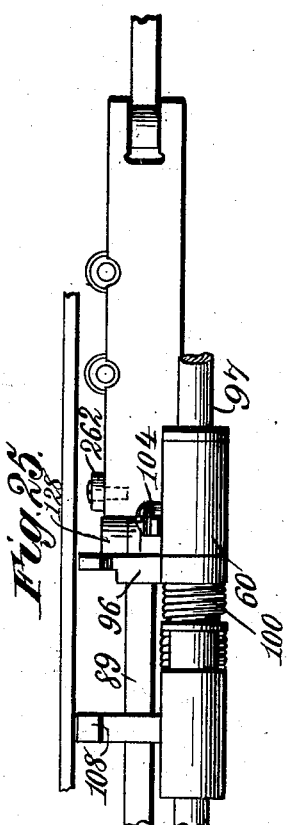
Witnesses,
Robert Everett.
H. W. Jones.
Inventor.
Wilbur S. Scudder.
By Albert H. Norris
Atty.

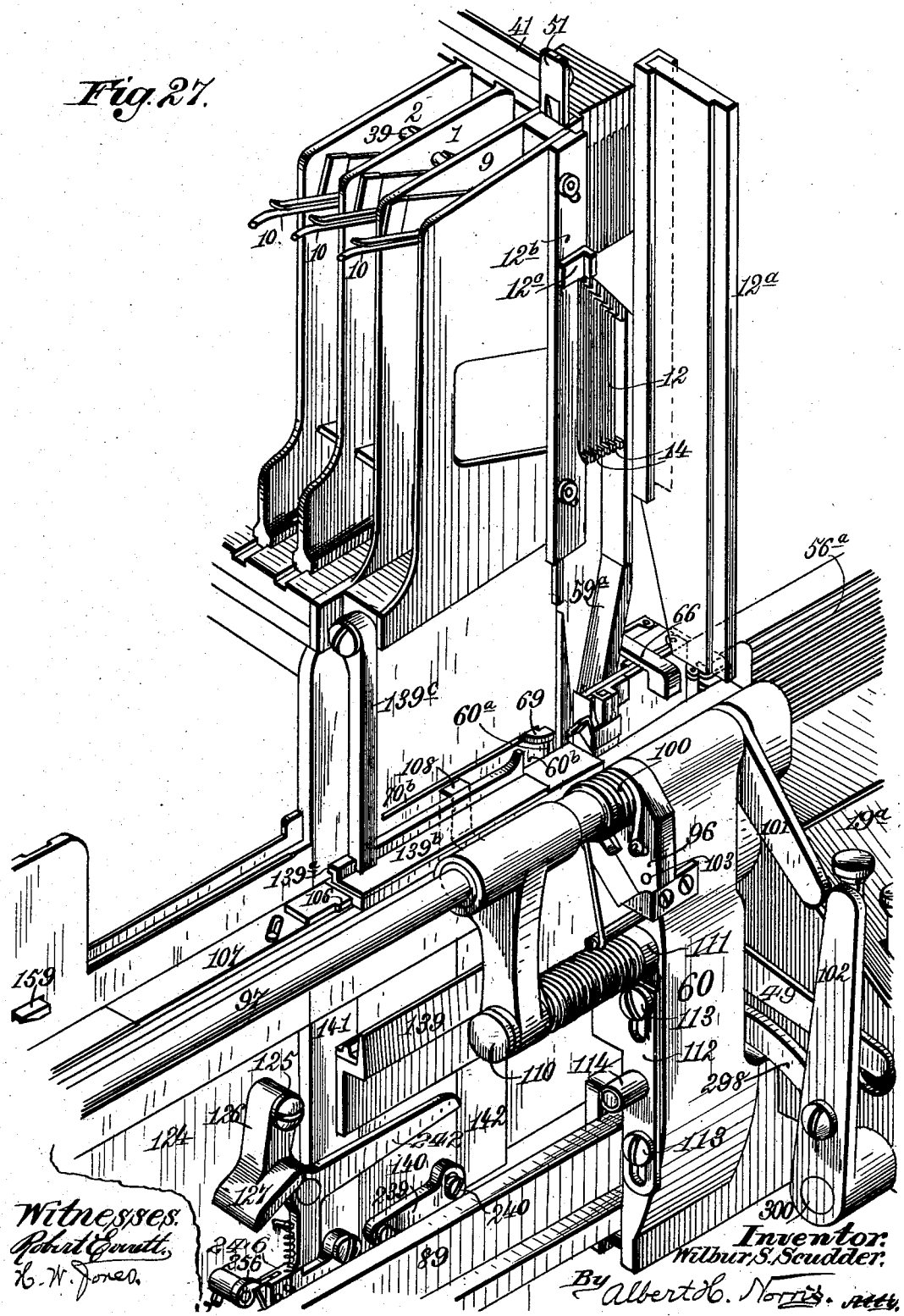

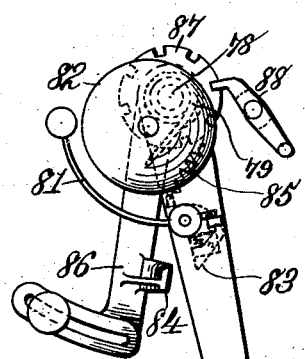

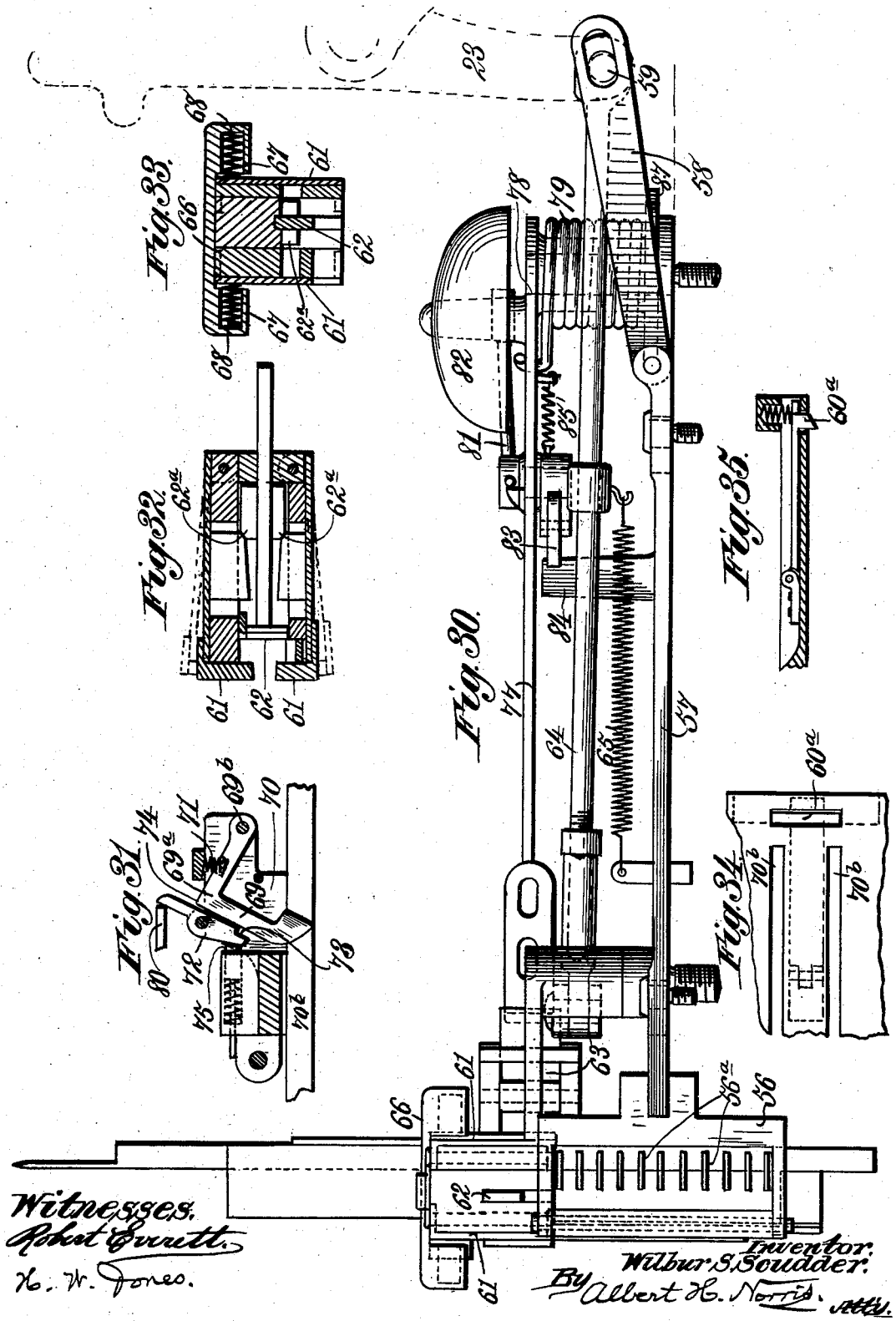

(No Model.)
21 Sheets—Sheet 12.
W. S. SCUDDER.
MONOLINE COMPOSING MACHINE.
No. 605,141.
Patented June 7, 1898.
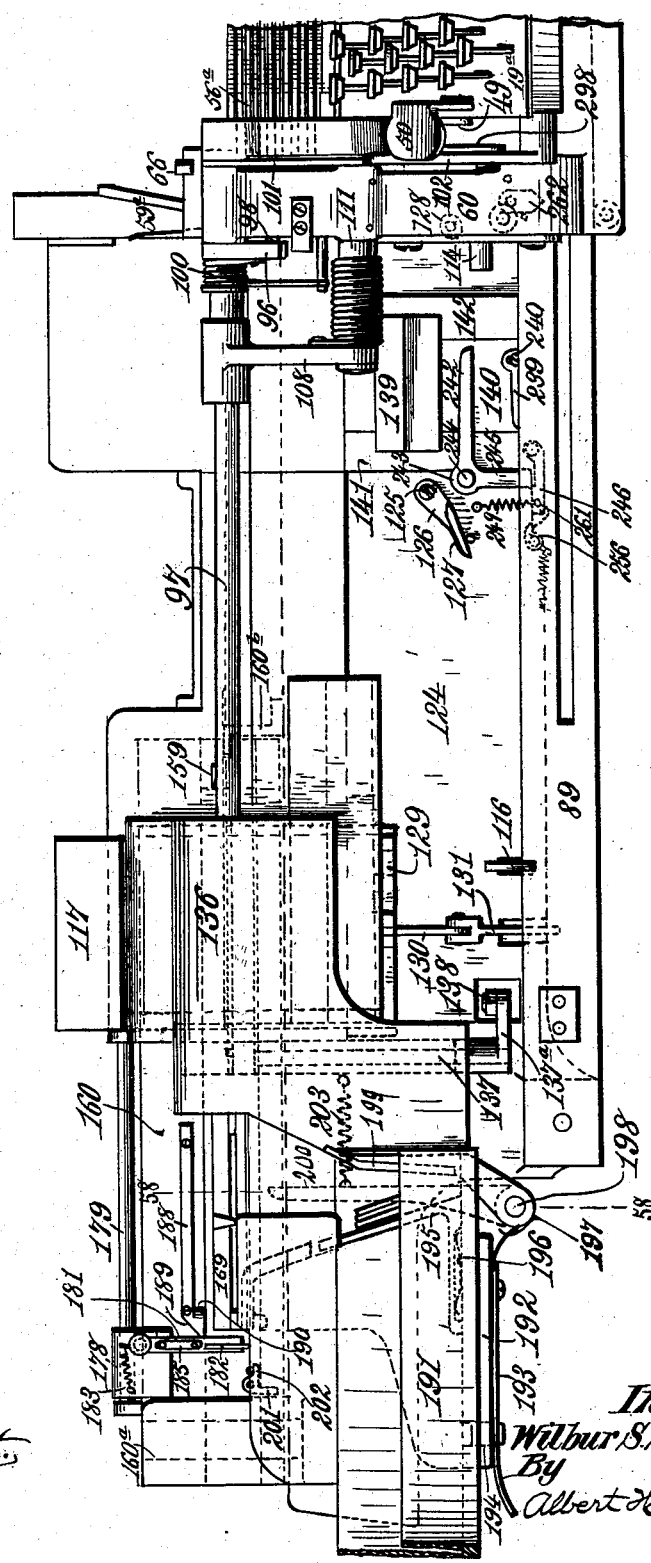
Witnesses.
Inventor.
Wilbur S. Scudder.
By Albert H. Norris.
Att'y.

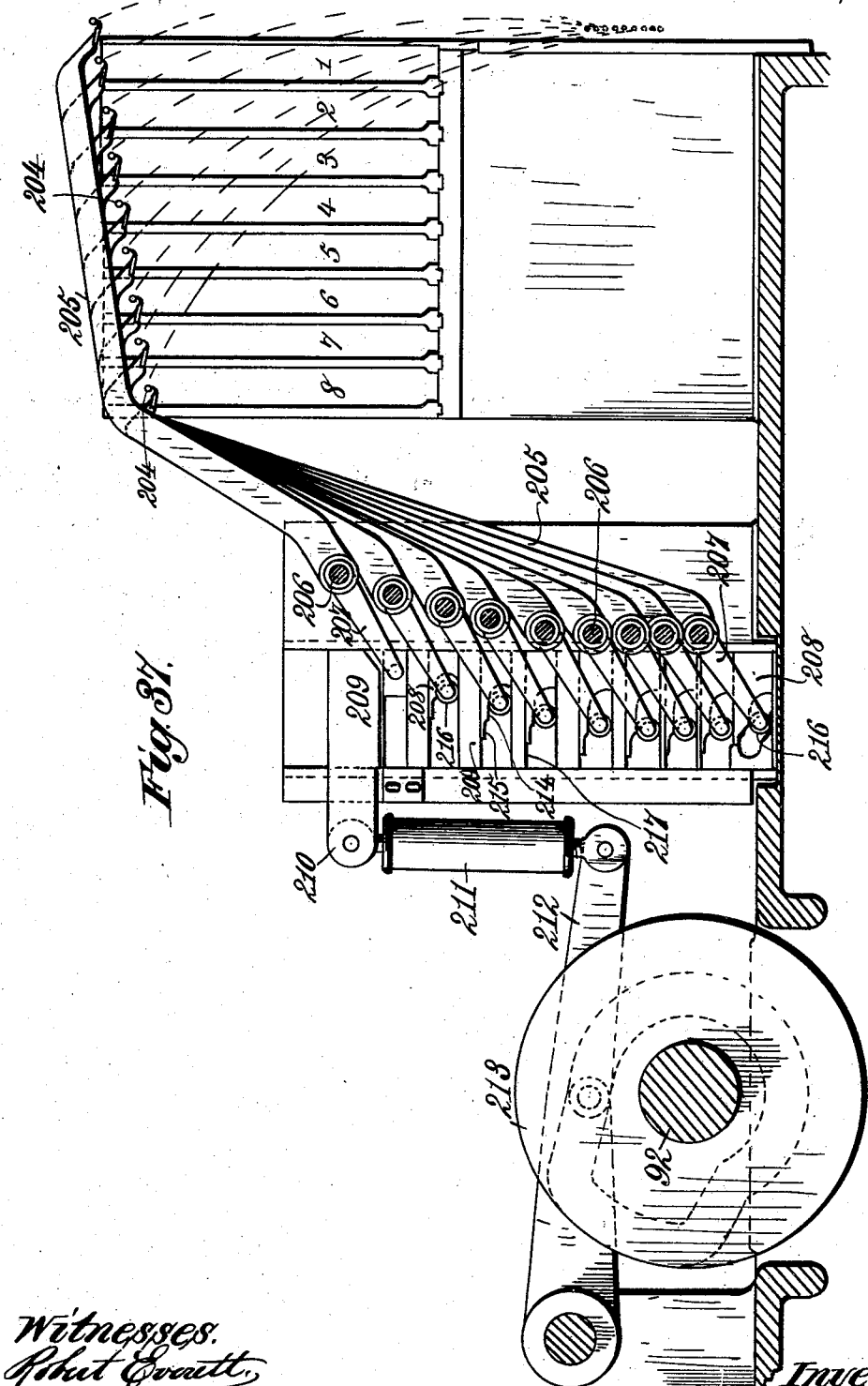

(No Model.)
21 Sheets—Sheet 14.
W. S. SCUDDER.
MONOLINE COMPOSING MACHINE.
No. 605,141. Patented June 7, 1898.
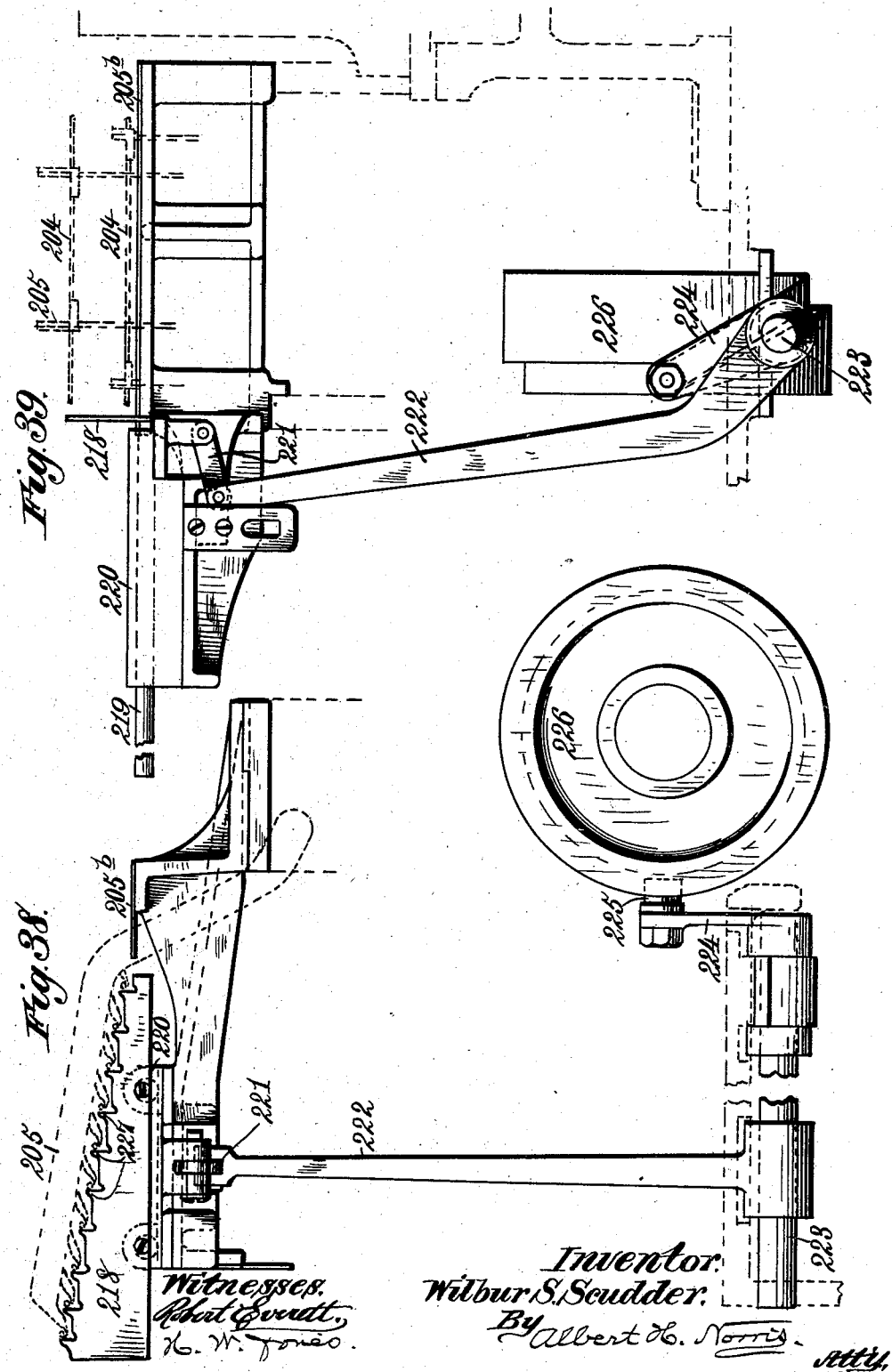

(No Model.)

W. S. SCUDDER.
MONOLINE COMPOSING MACHINE.

No. 605,141.

21 Sheets—Sheet 15.

Patented June 7, 1898.

Witnesses.
Robert Everett
H. W. Jones

Inventor:
Wilbur S. Scudder.
By Albert H. Norris
Atty.

THE NORRIS PETERS CO., PHOTO-LITHO., WASHINGTON, D. C.

(No Model.) 21 Sheets—Sheet 16.
W. S. SCUDDER.
MONOLINE COMPOSING MACHINE.
No. 605,141. Patented June 7, 1898.
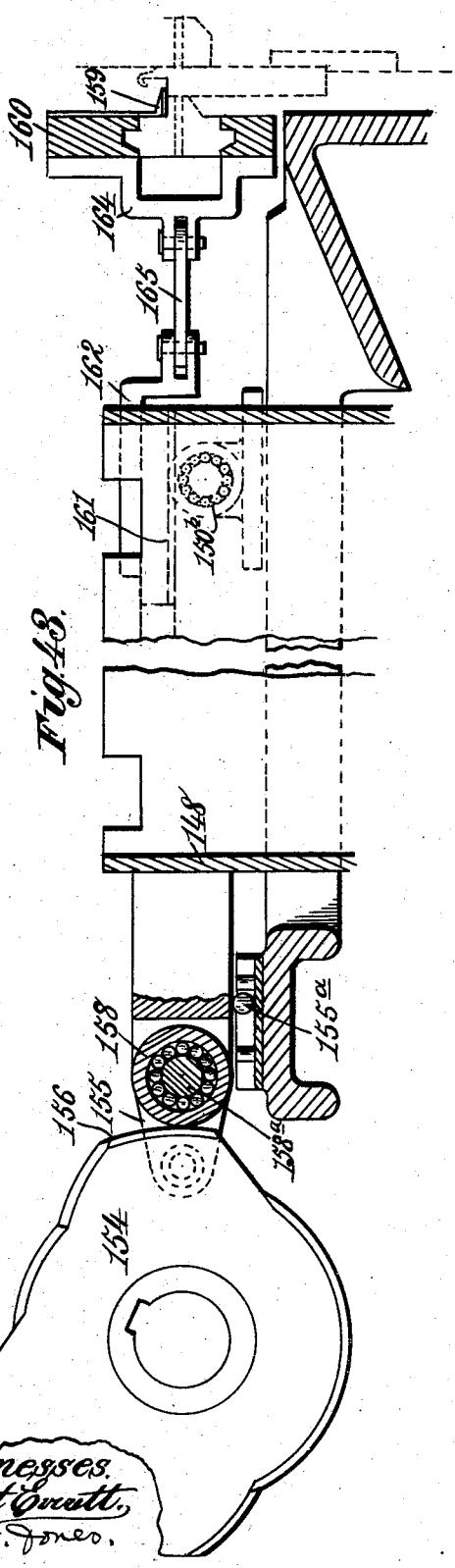
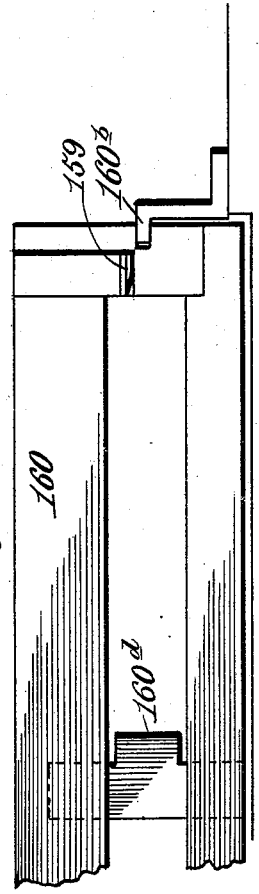
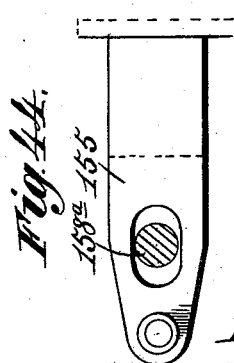
Witnesses.
Inventor.
Wilbur S. Scudder.
By Albert H. Norris.
Atty.

(No Model.)
W. S. SCUDDER.
MONOLINE COMPOSING MACHINE.
No. 605,141.  21 Sheets—Sheet 17.
Patented June 7, 1898.
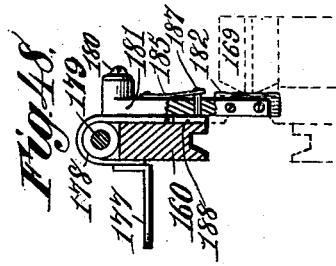
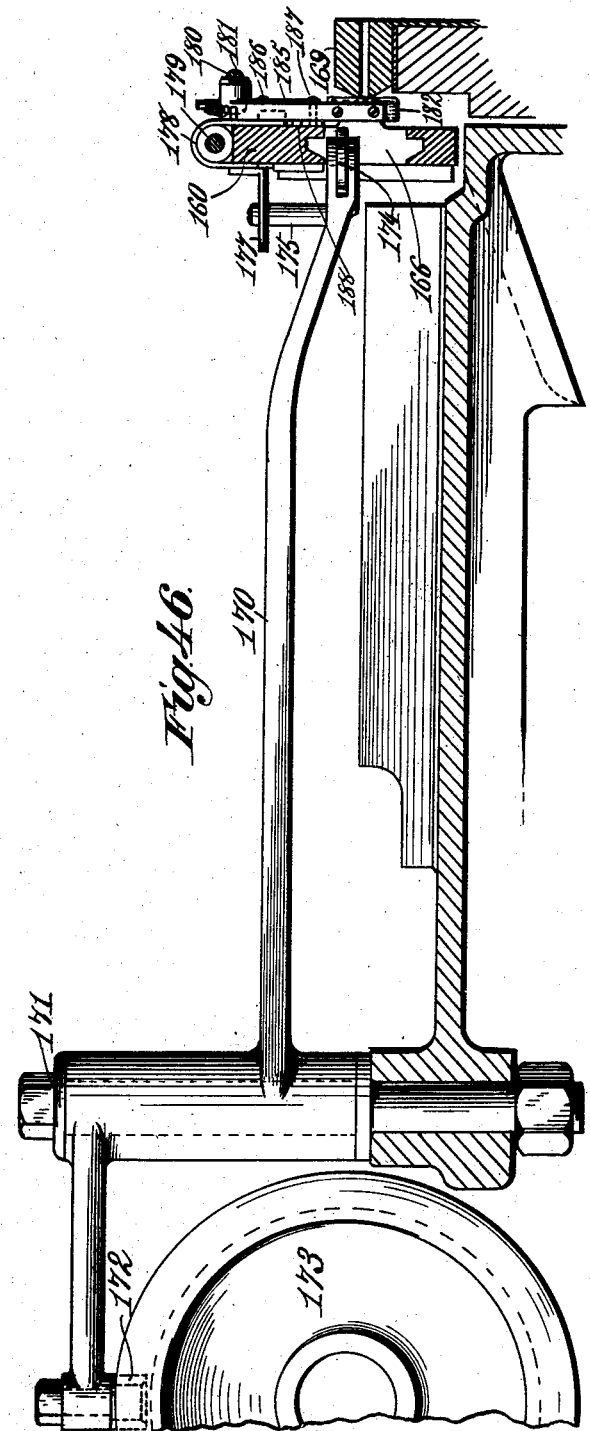
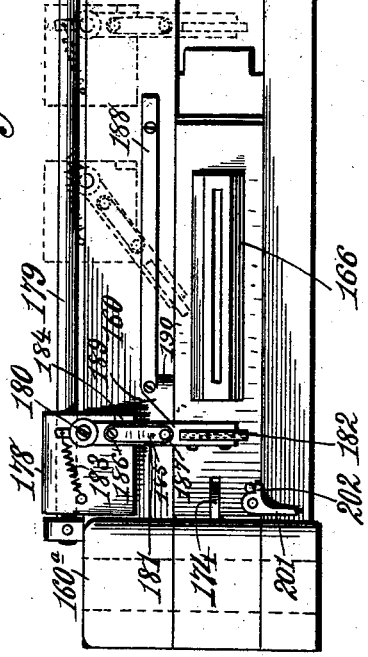
Witnesses.
Robert Garrett.
H. W. Jones.
Inventor:
Wilbur S. Scudder:
By Albert H. Norris.
Atty.

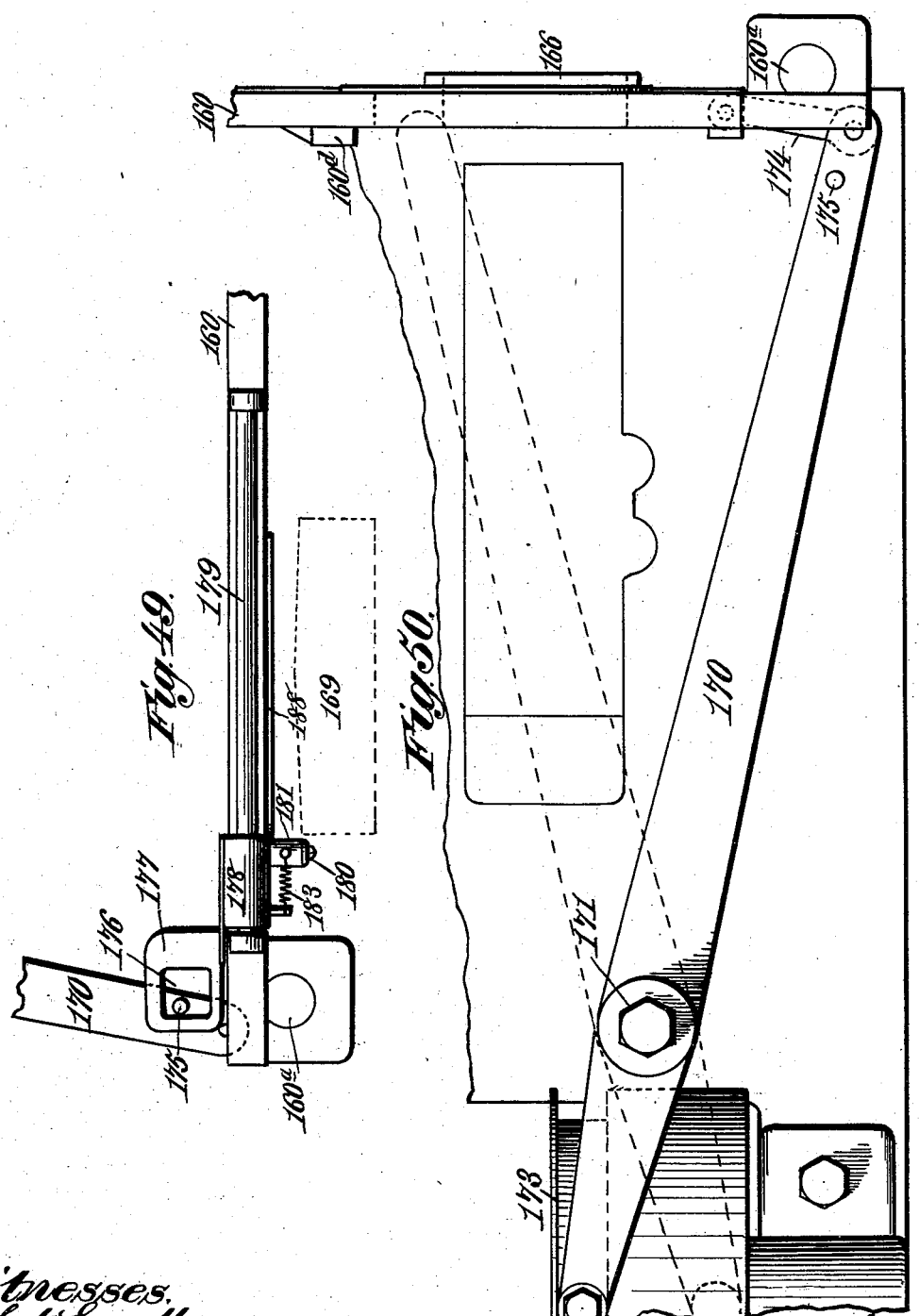

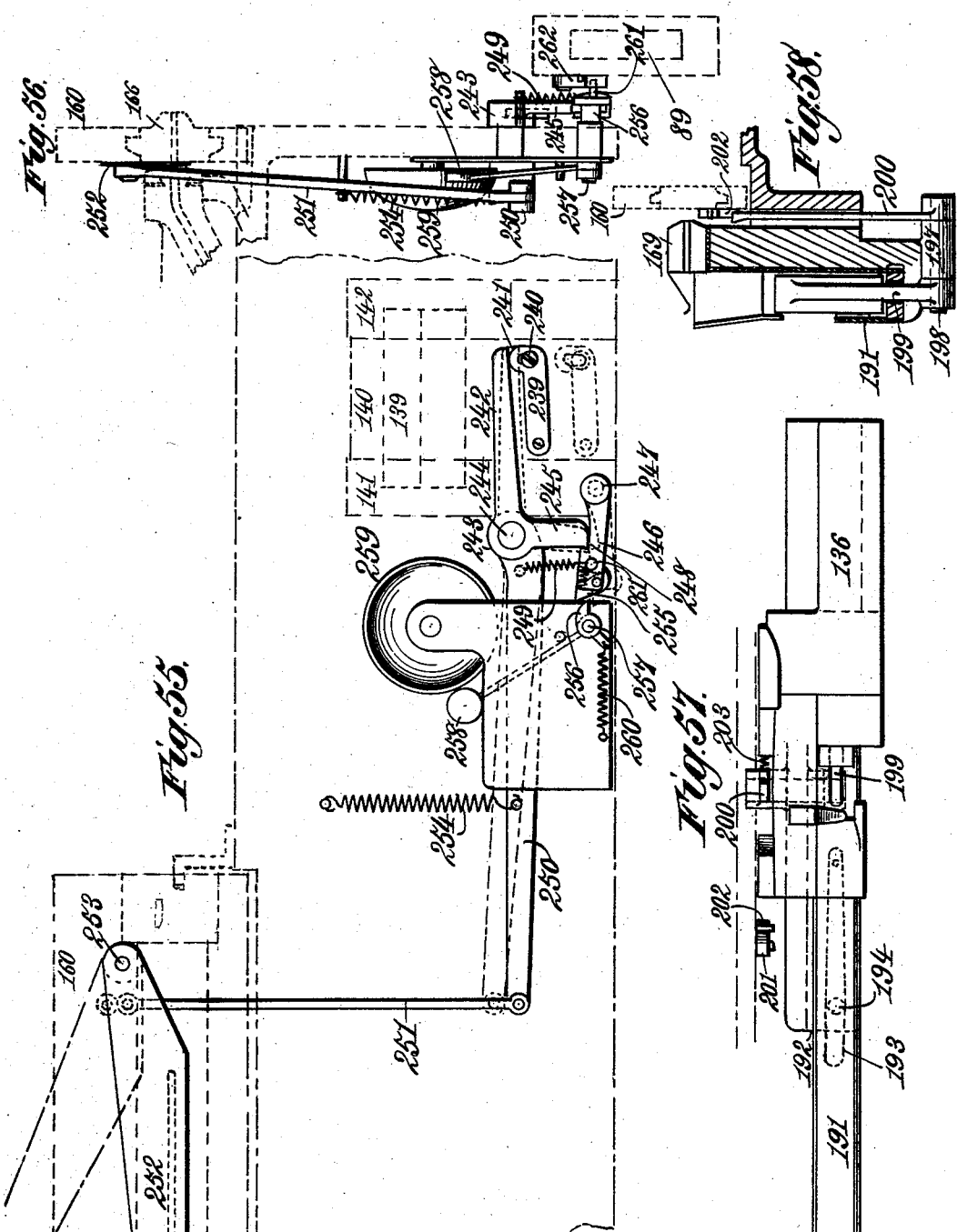

(No Model.)

W. S. SCUDDER.
MONOLINE COMPOSING MACHINE.

No. 605,141.

21 Sheets—Sheet 20.

Patented June 7, 1898.

Witnesses.
Robert Burnett
H. W. Jones.

Inventor.
Wilbur S. Scudder.
By Albert H. Norris
Atty.

(No Model.)  
21 Sheets—Sheet 21.

W. S. SCUDDER.
MONOLINE COMPOSING MACHINE.

No. 605,141. Patented June 7, 1898.

Witnesses.
Robert Everitt,
K. W. Jones.

Inventor.
Wilbur S. Scudder.
By Albert H. Norris
Atty.

THE NORRIS PETERS CO., PHOTO-LITHO., WASHINGTON, D. C.

UNITED STATES PATENT OFFICE.

WILBUR STEPHEN SCUDDER, OF BROOKLYN, NEW YORK, ASSIGNOR TO THE MONOLINE COMPOSING COMPANY, OF WASHINGTON, DISTRICT OF COLUMBIA.

MONOLINE COMPOSING-MACHINE.

SPECIFICATION forming part of Letters Patent No. 605,141, dated June 7, 1898.

Application filed October 4, 1897. Serial No. 653,969. (No model.)

*To all whom it may concern:*

Be it known that I, WILBUR STEPHEN SCUDDER, a citizen of the United States, and a resident of Brooklyn, in the county of Kings and State of New York, have invented certain new and useful Improvements in Monoline Composing-Machines, of which the following is a full, clear, and exact specification.

This invention relates to the monoline type composing and casting machine disclosed in United States Letters Patent No. 506,198, issued October 3, 1893, to W. S. Scudder, assignor to The Monoline Composing Company, wherein the matrix-bars are stored in their proper chambers in a magazine and are delivered in the order required and assembled in a line, the necessary space-bars being introduced into the line as it is being composed. A line-carriage engages the line of assembled or composed matrices and carries it to a justifying mechanism by which the space-bars are operated to expand and justify the line, after which the line-carriage shifts the line to the casting-point, where the type-high printing-bar is cast. The mold is then moved to the ejector, by which the cast printing-bar is ejected from the mold between trimming-knives and is deposited in a galley. The line held by the line-carriage at the casting-point is released and depressed by the depressor, and then the line-carriage is moved back to a distributer, the hooked ends of the matrix and space bars stringing themselves upon their proper horizontal distributing-wires, which are subsequently elevated into such position that a distributer-pusher will push the matrix and space bars from the distributing-wires into the appropriate chambers in the magazine.

The chief objects of the present invention are, first, to provide the front end of the magazine with a novel transparent cover or door and means for holding it closed for the purpose of conveniently and quickly gaining access to the foremost or leading matrix and space bars if occasion therefor should arise; second, to provide new and improved means for successively lifting the space-bars to place them in the channel from which they are forced at the required time into the assembly-box; third, to provide new and improved means for forcing the space-bars, when lifted, into the delivery-channel of the magazine and discharging them, one at a time, into the assembly-box for insertion into the line being composed; fourth, to generally improve and simplify the construction and operation of the oscillator or bell-crank-lever frame by which, among other things, the assembly-box ejector is operated and the slide-gates for delivering the matrix-bars from the magazine-channels are reset in operative connection with the finger-keys for subsequent movements to release the matrix-bars required to compose a line; fifth, to provide means for automatically arresting the back stroke of the oscillator after a finger-key is operated to prevent the rotary cam on the rear end of the oscillator being thrown at improper times into engagement with the continuously-rotating roller, whereby objectionable chattering or rapidly-repeated vibrations of the oscillator, incident to its rebounding or springing back when thrown forward to reset a matrix-bar-delivery gate, are avoided and smoother and more uniform actions are obtained; sixth, to provide novel and simplified means for operating the ejector by which the matrix and space bars are ejected from the assembly-box into the line-raceway; seventh, to improve and simplify the construction and operation of the assembly-box and the yielding carriage or slide on which is mounted the yielding line-abutment for one end of the line being assembled or composed, and to combine with these parts an audible signal for indicating when the line is approximately the proper length; eighth, to provide the assembly-box with means for preventing its jaws from unduly separating or spreading and for promptly closing the jaws when the assembly-box ejector is retracted to normal position; ninth, to improve and simplify the attachments of the line-carriage by which the line of assembled or composed matrices is carried to the justifier, the casting devices, and the matrix-bar distributer; tenth, to provide a second release of the line-carriage as the line is being transferred from the casting-point to the distributer to enable the distributing rods or wires to lift the line with greater facility; eleventh, to provide the monoline-machine with a safety or secondary depressor to insure the correct depression of the matrix-bars, so that their lower ends will be surely leveled and their hooked upper ends placed with accuracy in position to engage the distributing rods or wires; twelfth, to improve and simplify the devices by which the distributer-levers carrying the horizontal distributing-wires are operated, whereby the hooked ends of the matrix-bars are not unduly clamped or pressed upon by the distributing rods or wires when lowered to stand in a substantially perpendicular plane one above another, thus avoiding possible undue oscillating or swinging motions of the matrix-bars from front to rear of the machine as the distributing rods or wires rise in a curved path and spread into a substantially horizontal plane to permit the matrix and space bars to be pushed from the rods or wires into the proper chambers of the magazine; thirteenth, to improve the pot-supporting devices and provide a new and improved casting-pot, by which overheating of the metal in the well thereof is effectually avoided, and the well and its channel leading to the casting-point are immersed within the body of the molten metal, so that the metal in the well and said channel are not exposed to the direct action of the heating-flame from the burner, thus insuring a practically uniform temperature of the metal flowing into the mold; fourteenth, to provide a new pot cut-off for the automatic closing of the mouth of the casting-pot to prevent the passage of the metal into the mold if the line of matrix-bars assembled is a "loose" line—that is to say, if a line is of improper or such length that it cannot be and is not properly expanded by the space-bars to obtain a tight line in the line-carriage; fifteenth, to improve and simplify the mechanism by which the sliding mold is moved back and forth, whereby the more or less complicated system of levers underhanging the bed-plate of the machine is avoided and the mold-operating lever is located above the bed-plate; sixteenth, to improve and simplify the means whereby the pivoted mold-carrying frame in which the mold slides is moved back and forth relatively to the front of the machine, the construction being such that this is effected by the direct action of the casting-pot and the more complicated devices of the former patent for this purpose are dispensed with; seventeenth, to provide the monoline-machine with a novel recasting mechanism whereby any required number of type-high printing-bars may be cast from one and the same line of assembled matrix-bars; eighteenth, to provide new and improved means for wiping the trimming-knives as the mold moves from the casting-pot to the ejector which ejects the cast printing-bar from the mold between the knives; nineteenth, to provide a new and improved galley which can be conveniently and quickly removed and replaced and is in operative connection with a vibrating finger actuated by the horizontally-sliding mold for pushing the column of cast printing-bars a definite distance along the galley whenever a printing-bar has been or is about to be ejected from the mold; twentieth, to improve, simplify, and render more satisfactory in action the automatic stop mechanism by which the motion of the line-shaft is automatically stopped after one cycle of motions, or rather after the line-carriage has traveled from the assembly-box to the casting-point and returned to normal position; twenty-first, to provide a new and improved means of a simple and effective character for operating the clutch of the starting and stopping mechanism to automatically stop the rotation of the main or line shaft after each cycle of motions of the machine; twenty-second, to generally improve, simplify, and render the monoline composing-machine more effective, reliable, and satisfactory in practical use for the production of type-high printing-bars possessing the high perfection desired in the printing art.

To accomplish all these objects, the present invention involves the features of construction, the combinations or arrangements of parts, and the principles of operation hereinafter described and claimed, reference being made to the accompanying drawings, in which—

Figure 2:
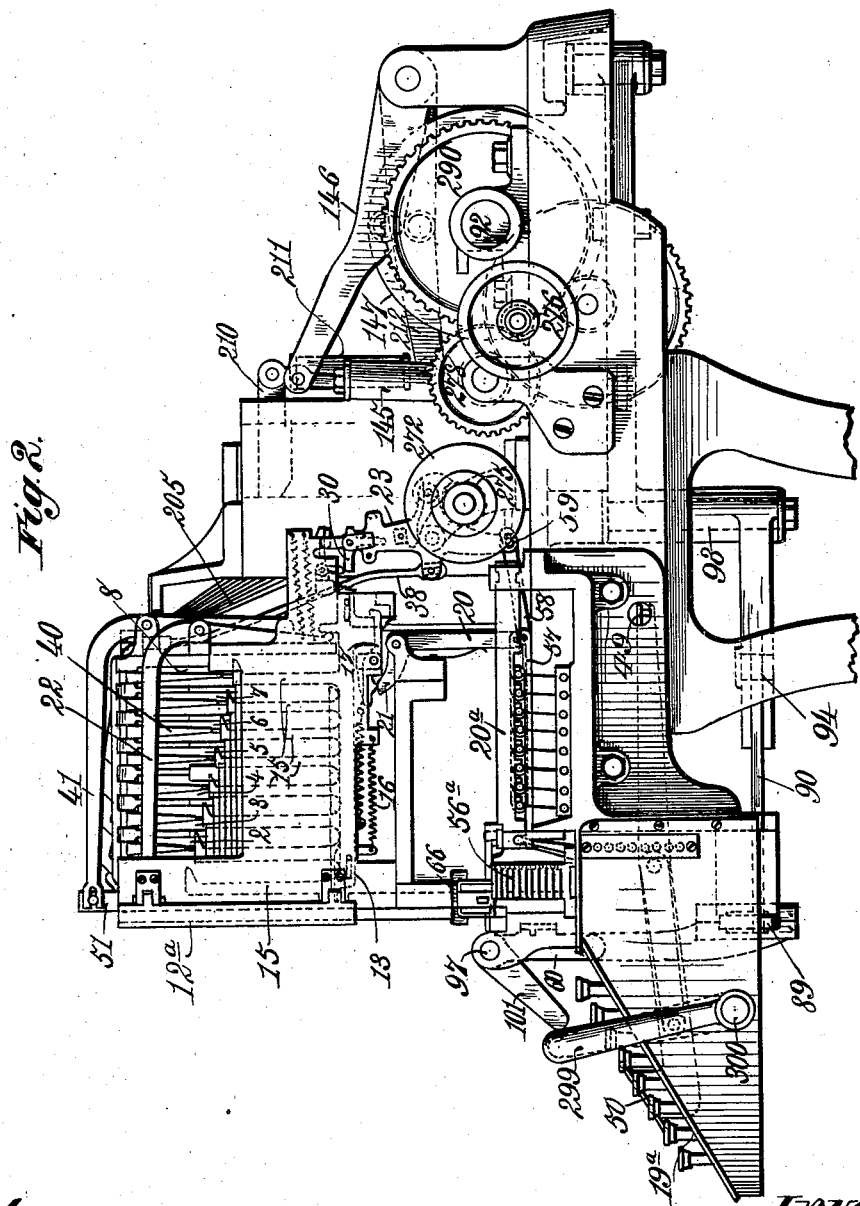
Figure 3:
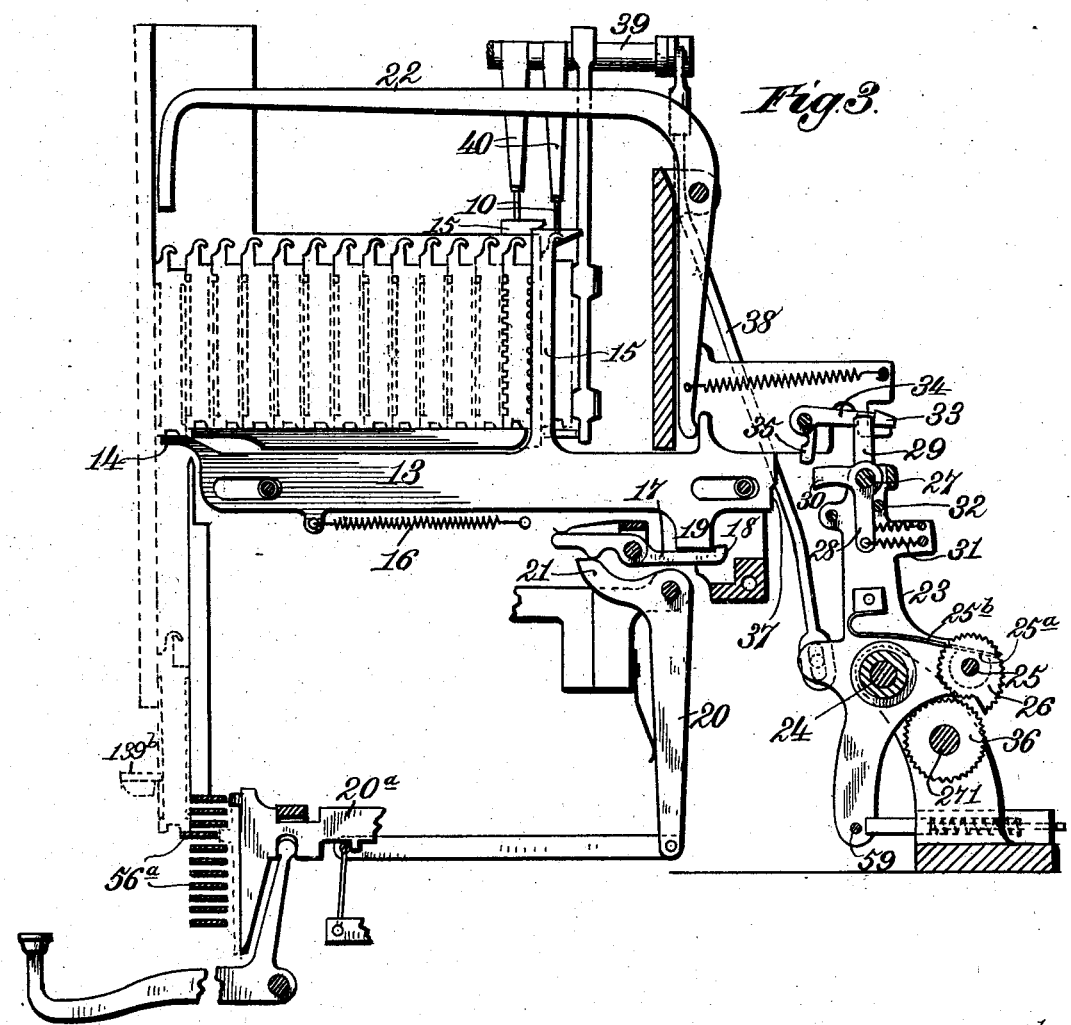
Figure 4:
Figure 40:
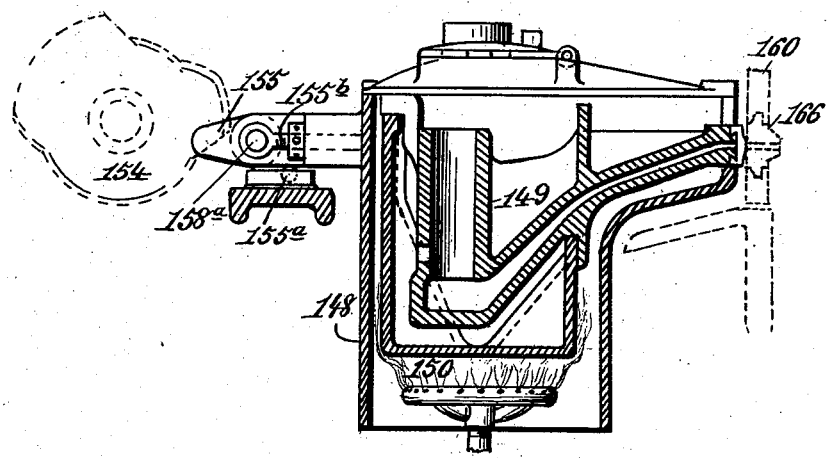
Figure 41:
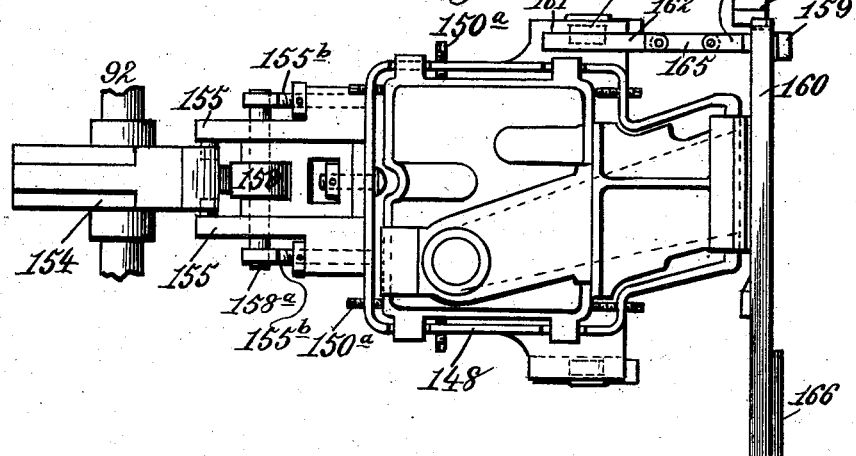
Figure 42:
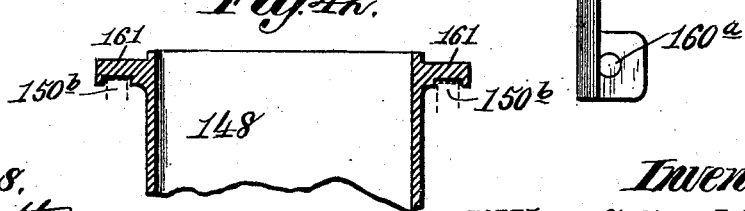
Figure 59:
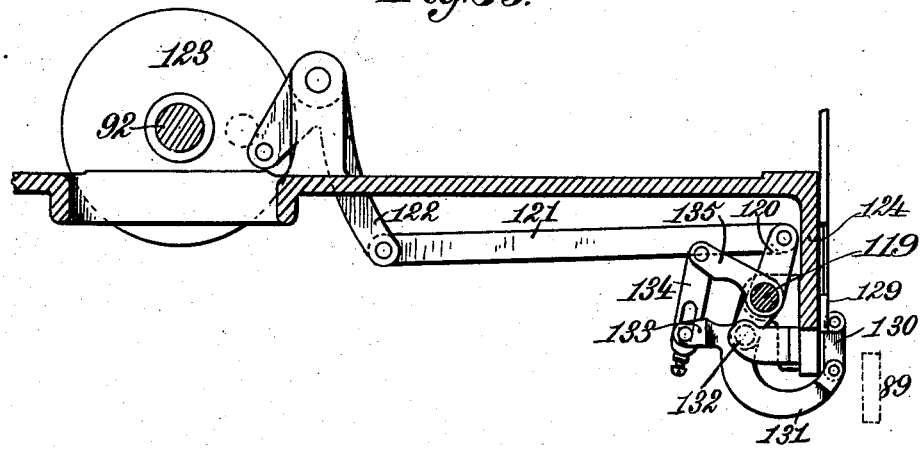
Figure 60:
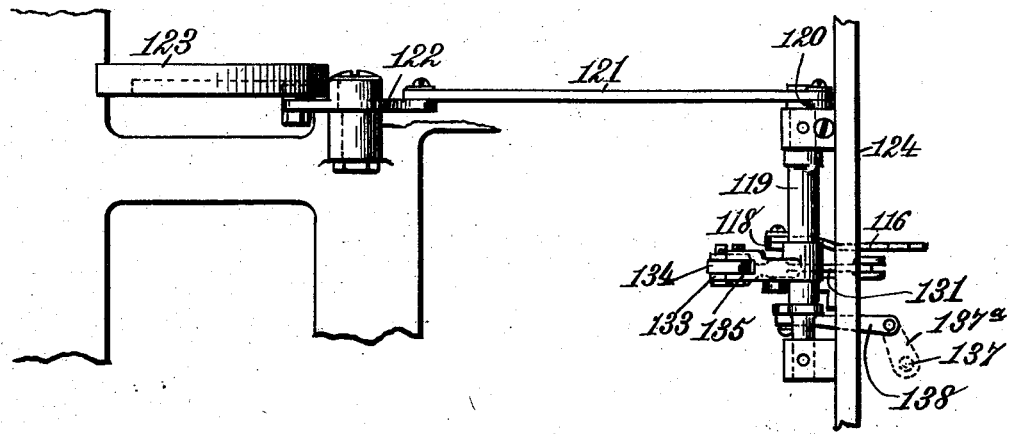
Figure 61:
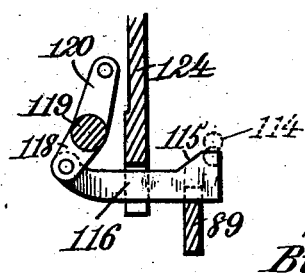
Figure 62:
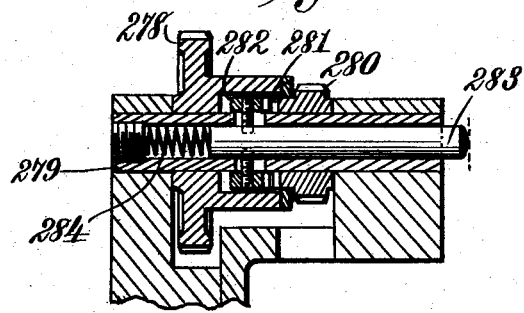
Figure 63:
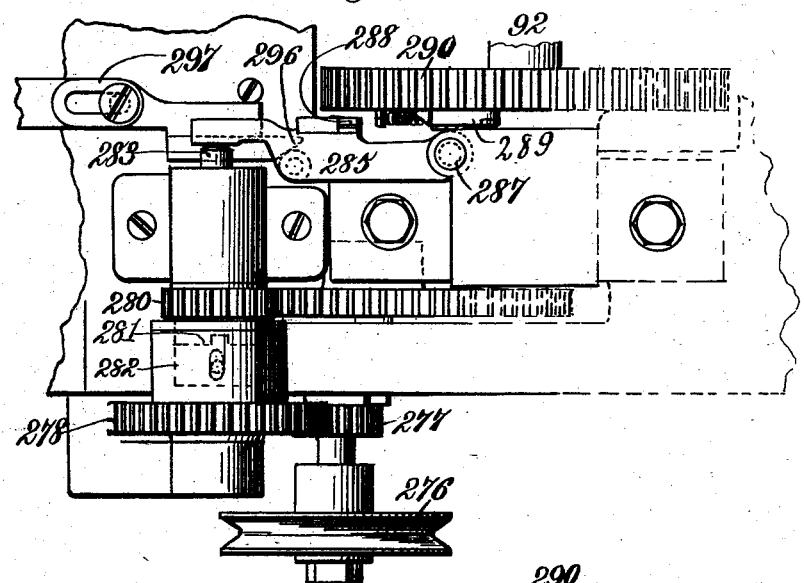
Figure 64:
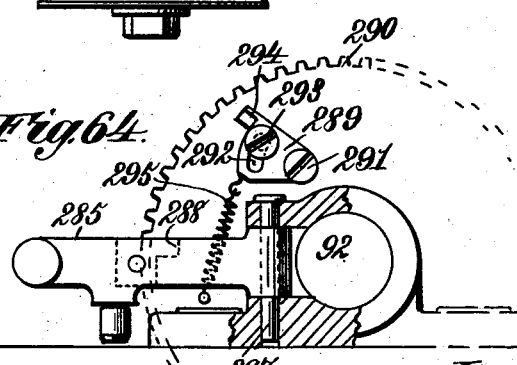

Figure 1 is a plan view of the new monoline composing-machine, the matrix-bar-accelerating levers being omitted to avoid confusing lines and for better illustration of novel parts. Fig. 2 is a right-hand end elevation of the machine with the accelerating-levers in position. Fig. 3 is a detail vertical sectional view of the machine, showing the oscillator in normal position. Fig. 4 is a detail plan view of the matrix-bar-delivery gates, the oscillator, and the devices whereby the roller which actuates the oscillator-cam can be driven independently of the gear mechanism which drives the line-shaft. Fig. 5 is a detail view of the oscillator, showing a matrix-bar-delivery gate at the limit of its back stroke. Fig. 6 is a similar view showing the oscillator thrown forward to reset the gate. Fig. 7 is a detail sectional elevation of the magazine, showing the space-bar lever set for action when the space-key is operated. Figs. 8 and 9 are detail views showing the spring-lever and portions of the parts by which the detaining-pawl of the space-bar lever is connected with the space-key. Fig. 10 is a detail plan view showing the finger on the oscillator to reset the space-bar lever. Fig. 11 is a vertical transverse sectional view through one of the matrix-bar chambers of the magazine. Fig. 12 is a detail sectional plan view showing the relative arrangement of the matrix-bar chambers and the delivery-channels of the magazine. Fig. 13 is a vertical transverse sectional view taken through the space-bar chamber of the magazine. Fig. 14 is a detail sectional view in a plane at right angles to the plane on which Fig. 13 is taken. Fig. 15 is a detail perspective view of the slide with its space-bar lifter and pusher-arms. Fig. 16 is a detail plan view of the space-bar chamber. Fig. 17 is a detail sectional view taken on the line 17 17, Fig. 13, showing the spring-latch to prevent back motion of the matrix-bar in the shortest or extreme left-hand matrix-delivery channel of the magazine. Fig. 18 is a detail vertical sectional view showing the space-bar lifter and pusher arms depressed. Fig. 19 is a similar view showing the lifter and pusher arms raised. Fig. 20 is a detail sectional view taken on the line 20 20, Fig. 18. Fig. 21 is a detail perspective view of the spring-pusher by which each space-bar when lifted is pushed over the fixed notch-retaining plate. Fig. 22 is a detail perspective view showing the leaf-spring to arrest and temporarily support each space-bar in its delivery-channel. Fig. 23 is detail front elevation of the line-carriage. Fig. 24 is a sectional elevation looking at the left-hand side of the line-carriage. Fig. 25 is a detail top plan view of the line-carriage. Fig. 26 is a detail broken front elevation showing the ratchet-hub and sleeves for expanding the line-carriage to release the line. Fig. 27 is a detail perspective view of various parts, looking at the assembling-point of the machine. Fig. 28 is a detail plan view showing the assembly-box, the traveling line-abutment, and the parts for restoring the latter to normal position. Fig. 29 is a detail front elevation of the same. Fig. 30 is a detail view looking at the right-hand side of the parts represented in Figs. 28 and 29. Fig. 31 is a detail sectional view of the line-abutment carriage or slide-block, showing the line-abutment released as when the parts are moving to normal position. Fig. 32 is a horizontal sectional view of the assembly-box. Fig. 33 is a cross-sectional view of the same. Fig. 34 is a detail front view showing the detaining-pawls which, with the line-abutment, hold the line being assembled. Fig. 35 is a horizontal sectional plan view of the same. Fig. 36 is a detail front elevation omitting various parts to enable the figure to be made on a scale sufficiently large to clearly show novel features. Fig. 37 is a sectional elevation of the distributer, showing the distributer-levers raised. Fig. 38 is a detail elevation of the distributer-pusher and its operating devices. Fig. 39 is a front elevation of the same. Fig. 40 is a vertical sectional view of the casting-pot and its supporting-jacket. Fig. 41 is a plan view of the pot and jacket. Fig. 42 is a detail sectional view of the upper end of the jacket, showing its flanges, which rest on roller-bearings. Fig. 43 is a detail vertical sectional view showing the mold-carrying frame and pot-actuating cam. Fig. 44 is a detail view of one of the arms of the pot-jacket to show the slot for the shaft of the roller on which the pot-cam operates. Fig. 45 is a detail front view of the right-hand end of the mold-carrying frame. Fig. 46 is a detail vertical sectional view from front to rear, showing the mold-carrying frame, the wiper-carrier, the trimming-knives, and the means for sliding the mold and wiper carrier. Fig. 47 is a detail front elevation of the same. Fig. 48 is a vertical sectional view of a portion of the parts represented in Fig. 47, showing the spring-pin of the wiper-arm pressed outward. Fig. 49 is a detail plan view of portions of the mold-carrying frame and its actuating-lever, showing the wiper-carrier and indicating the trimming-knives by dotted lines. Fig. 50 is an enlarged plan view similar to Fig. 46, omitting the wiper-carrier and its guide-rail, to clearly show the connection between the mold and its actuating-lever. Fig. 51 is a detail plan view of the cam-sleeve, showing the devices for unlocking it from the main shaft for recasting purposes. Fig. 52 is a detail sectional elevation of the same. Fig. 53 is a detail cross-sectional view showing the parts in position to unlock the cam-sleeve from the main shaft. Fig. 54 is a similar view showing the parts in position for locking the cam-sleeve to the main shaft. Fig. 55 is a detail front elevation with parts omitted to more clearly show the novel pot cut-off and loose-line-signal devices. Fig. 56 is an end elevation of the same. Fig. 57 is a detail plan view of the left-hand end portion of Fig. 36 to more clearly show the galley-box. Fig. 58 is a detail vertical sectional view taken on the line 58 58, Fig. 36. Fig. 59 is a detail sectional elevation showing the devices for operating the vertically-movable or primary line-depressor. Fig. 60 is a plan view of the same. Fig. 61 is a detail sectional view showing the devices for operating the transverse wedge-slide which effects the first release of the line at the primary line-depressor or casting-point. Fig. 62 is a detail sectional view of the clutch devices for stopping and starting the main or line shaft. Fig. 63 is a detail plan view to more particularly show the automatic stop devices. Fig. 64 is a detail sectional elevation showing the clutch-operating lever and the spring dog or pawl on the drive-wheel of the main or line shaft for automatically stopping the machine.

In order to enable those skilled in the art to make and use this invention, the improvements will now be described in detail, reference being had to the reference numerals and letters, which designate in the drawings the parts hereinafter referred to.

*The matrix-bars and spacers.*—The matrix-bars and space-bars are essentially the same as those described in the former Letters Patent and may be produced in any manner suitable for the purpose in hand; but the matrix-bars are advisedly made according to my improved system by first obtaining from a line of fixed types by electrodeposition of metal an accurate master matrix-bar, casting from or by this master matrix-bar a solid type-line or slug bearing relief characters the counterparts of the intaglio characters of the master matrix-bar, adjusting the relief characters of the type-line or slug accurately with relation to recesses formed in one edge of a blank matrix-bar, and reproducing the relief characters in intaglio form in the recessed edge of the blank matrix-bar by electrodeposition of metal, such as copper.

*The magazine and matrix-bar delivery mechanism.*—As in Letters Patent No. 506,198, the magazine is divided by vertical partitions extending in the direction of the length of the machine to create eight matrix-bar chambers 1 to 8, inclusive, and a space-bar chamber 9. (Best seen in Figs. 11, 12, and 27.) These chambers are provided in their upper parts with supporting guide rails or wires 10, running lengthwise of the chambers, and upon which the matrix and space bars are suspended by their hooks, the guide rails or wires inclining downward toward the delivery-channels of the magazine. The matrix-bar chambers terminate at their delivery ends in separate narrow channels 12, which extend in a line at right angles to the chambers. The matrix-bars move along the inclined guide rails or wires and enter their respective delivery-channels to be fed forward, one by one, to the delivery-point at the front end of the channel, from whence they are caused to enter the assembly-box. The matrix-bars are fed and delivered in the order required by horizontal delivery-gates 13, Figs. 2 and 3, which at their tips or front ends 14 constitute supports for the lower ends of the leading matrix-bars. The matrix-bars in the delivery-channels are moved forward until the leading or front matrix-bars slightly fall and rest upon the tips or front ends of the delivery-gates, and when these gates are released and move rearward the leading or front matrix-bars, being unsupported, will take their downward flight. The delivery-gates are each provided with a thin upright matrix-bar feed-finger 15, which moves in a matrix-bar channel, and when a gate moves rearward this finger also moves rearward and passes the mouth of the matrix-bar chamber communicating with said channel, whereby a matrix-bar will pass by gravity from the chamber into the channel, and when the gate moves forward the finger pushes forward the line or bank of matrix-bars in the channel and places another bar upon the tip or front end of the gate to take the place of the one previously delivered to the assembly-box.

The delivery ends of the matrix-bar channels 12 are covered by a transparent door $12^a$, set in a frame, Figs. 2 and 27, which is hinged at one vertical edge to the right-hand vertical corner of the magazine and is adapted to bodily swing open, as shown in Fig. 27, for free access to the delivery ends of the channels 12 or to the leading matrix-bars therein and to the foremost or leading space-bar, which latter will be exposed through a narrow vertical space in the delivery-channel of the space-bar chamber. The door when closed is held by a vertically-movable slide $12^b$, having oblique slots, through which pass pins, the construction being such that the slide moves by gravity downward and toward the door to lap over the edge thereof. If the door is open and is swung to the closed position, its free edge strikes a small angular bracket $12^c$ on the slide, and the latter will be caused by the pins and oblique slots to move up and to the left until the door passes the slide and is closed, whereupon the slide falls by gravity and holds the door closed.

The delivery-gates are each swiftly moved rearward through the medium of a spring 16, and is held in its advanced or forward position against the tension of the spring through the medium of a pawl 17, pivoted centrally between its ends and having a hooked rear end 18 to engage a lug 19 on the delivery-gate. The front end of the pawl is acted on by a spring which tends to throw the hooked extremity of the pawl upward into engagement with the lug on the gate, and the pawl is disengaged from the gate when a key of the keyboard $19^a$, Figs. 1, 2, and 36, is touched, through the medium of a pivoted spring-pressed detent-lever 20, Figs. 2 and 3, having an arm 21, provided with a rounded portion bearing against a rounded part on the front end portion of the pawl. The provision of the pawls 17 to hold the matrix-delivery gates set or in their advanced position and the actuation of these pawls through the medium of the detent-levers are improvements which secure a more delicate and quick release of the delivery-gates and obtain a smoother action of the parts which are under control of the finger-keys.

As in the former patent, there is employed in the present machine an assortment of ninety-six different characters and ninety-six different keys in the keyboard, one for each character. The characters of the matrix-bars are divided into groups of twelve, a different group being carried by each different species of matrix-bar, and as each species is in a separate chamber controlled by a delivery-gate, twelve finger-keys appropriate to the twelve characters of any one group of matrix-bars are susceptible of controlling one and the same delivery-gate. This is effected by connecting the detent-levers 20 with the slides $20^a$, Figs. 1 and 2, that are actuated by the finger-keys, as clearly described in the former patent, for which reason further explanation is not here considered essential. It may be said, however, that the slides $20^a$ serve to advance the stop-bars $56^a$, by which the downward flight of the matrix-bars is arrested, as in the former monoline-machine.

As clearly indicated in Fig. 12, the extreme left-hand matrix-bar-delivery channel is considerably shorter than all the others, and ordinarily such channel only contains a single matrix-bar. To effectually prevent back motion of this matrix-bar when the delivery-gate of the short channel springs rearward to permit the matrix-bar to take its downward flight, the wall of the space-bar chamber, which forms the left-hand side of the short channel, is provided with a vertical latch or pawl plate 10ª, Figs. 7, 13, and 17, having a broad beveled nose pressed outward by springs. When the delivery-gate is advanced, its upright finger forces the matrix-bar past the beveled nose of the latch or pawl plate, and it engages, retains, and assists in supporting the matrix-bar in a perpendicular position in such manner that when the delivery-gate springs rearward to release the matrix-bar the bar cannot move back with the gate. The same conditions do not exist as regards the other delivery-channels, in that there is always a plurality of matrix-bars in each of said channels, which is sufficient to resist any tendency of the leading matrix-bars to slightly move back with the gates when they are released.

The matrix-bar channels of the magazine are each provided with an accelerating-lever 22, Fig. 3, thrown into action by a spring when the corresponding delivery-gate is released for the purpose of suddenly acting on the delivered matrix-bar, accelerating its downward flight and swiftly shooting it into the assembly-box. The delivery-gates require to be reset in operative connection with the pivoted pawls 17, and consequently with the keyboard mechanism, each time they have been released and moved rearward, which is accomplished by the new oscillator, as will hereinafter appear.

*The oscillator.*—In the back motion of each delivery-gate it comes in contact with a part of what in the former patent is designated a "bell-crank-lever frame," which has been materially improved and will hereinafter be termed the "oscillator." This oscillator 23 (best seen in Figs. 2, 3, 5, and 6) comprises a frame composed of two side plates suitably pinned together. The side plates referred to are pivotally mounted near their centers upon a shaft 24 in such manner that the frame can oscillate back and forth, its upper end moving forward as its lower end moves rearward, and conversely. The oscillator is provided with rear projections approximately in line with the shaft 24 to support a shaft 25, on which the rotary cam 26 is mounted. The upper end of the oscillator is provided with a pin 27, on which are mounted a series of double-armed levers, each comprising a downwardly-projecting arm 28 and a forwardly-projecting arm 30, the latter being respectively coincident with the respective delivery-gates. The downwardly-projecting arm 28 of each lever is connected with a spring 31, which normally tends to force this arm against a rear stop-pin 32, thus causing the lever to normally stand as shown in Fig. 3. The number of double-armed levers is coequal with the number of delivery-gates—that is to say, there is one lever for each gate—and since the present machine, like the former machine, contains eight delivery-gates there are eight levers provided. The upper end 29 of the oscillator is adapted to engage a rocking stop-dog composed of a bar 33 on a rearwardly-projecting portion 34, pivoted to plates attached to the rear of the magazine and having a depending portion 35, lying in the path of the rear ends of all the matrix-bar-delivery gates, the construction being such that when the parts are in the normal position represented in Fig. 3 the upwardly-projecting end 29 of the oscillator will be engaged by the stop-dog 33 and the rotary cam 26 will be held slightly above and out of engagement with the continuously-rotating roller 36. When a delivery-gate is released and is moved rearward, as in Fig. 5, its rear end will strike the depending portion 35 of the stop-dog 33 and raise it from engagement with the upwardly-projecting end 29 of the oscillator. The gate will then quickly contact with the forwardly-projecting arm 30 of the double-armed lever corresponding to said gate and move rearward with the oscillator as the upper end of the latter bounds or springs back to place the rotary cam 26 into engagement with the continuously-rotating roller 36.

When a delivery-gate is released and moved rearward, the hooked end of the retaining-pawl 17 will bear against the lower edge of the lug 19, as in Fig. 5, to enable the gate to be subsequently moved forward and reset into engagement with the pawl.

The surfaces of the cam and roller are finely serrated or toothed to secure a positive action of the parts. The roller 36 rotates the cam and thereby throws the upper end of the oscillator forward, and the forwardly-projecting arm 30 of the double-armed lever corresponding to the delivery-gate to be reset will act upon the rear end of said gate and push it forward until the lug 19 on the gate is engaged with the hooked end 18 of the pawl 17 which coöperates with said gate, as in Figs. 3 and 6. The rear edge of each gate is cut away at its lower portion 37, so that the arm 30 will bear against the upper uncut portion of the rear edge, Figs. 5 and 6, and insure the complete resetting of the gate. As the upper end of the oscillator rocks forward a double-armed lever which is being moved forward will maintain contact with the upper portion of the rear edge of the gate; but the remaining double-armed levers will remain in their normal position and stand directly opposite the cut-away portions 37 of the rear edges of the gates, while the acting double-armed lever will stand in the position represented in Fig. 6, whereby the gate being acted on by the double-armed lever can be completely reset without the other double-armed levers coming in contact with the rear ends of the remaining gates before the gate being moved forward has reached the required position to be automatically engaged by the pawl 17. When the delivery-gate is moved forward by its double-armed lever, the depending portion 35 of the stop-dog 33 is released, and the dog falls into such position that when the rotary cam has made a complete revolution and the oscillator bounds or springs rearward it will be arrested by the stop-dog engaging the upper end 29 of the oscillator, and therefore the rotary cam cannot engage the continuously-rotating roller. In the construction illustrated in the former patent when the oscillator or bell-crank-lever frame is thrown forward it rebounds and causes the rotary cam to engage the continuously-rotating roller at an improper time, and not infrequently repeated vibrations of the oscillator result, thereby producing an objectionable chattering, which the present construction entirely avoids. In other words, in the present invention the stop-dog automatically arrests the back stroke of the oscillator after a finger-key is operated and a delivery-gate has been reset, and the rotary cam at the rear of the oscillator cannot be thrown at improper times into engagement with the continuously-rotating roller, thus avoiding objectionable chattering or rapidly-repeated vibrations of the oscillator incident to its rebounding when thrown forward to reset a matrix-bar-delivery gate. A smoother and more uniform operation of the parts is also obtained by the present improvement.

The release of a gate, its rearward motion, the back motion of the upper end of the oscillator, the engagement of the cam with the cam-actuating roller, and the forward motion of the oscillator to reset the gate are instantaneous, or substantially so, due to the swift action of the parts.

The arresting stop-dog 33 is particularly important if the lower end of the oscillator is moved forward by the action of a spring, as hereinafter appears particularly in connection with the detailed description of the assembly-box ejector. If the lower end of the oscillator is moved forward by a spring, it is essential to arrest the back stroke of the upper end thereof to prevent the oscillator-cam engaging the cam-actuated roller on the back stroke after a delivery-gate has been reset. It is to be understood, however, that as regards the oscillator and its arresting device the oscillator may be thrown rearward at its upper end by the direct action of a released delivery-gate, as in the former patent, and need not necessarily be acted upon at its lower end by a spring.

In Figs. 3, 5, and 6 there is exhibited a horizontal spring-projected pin or rod on the support of the oscillator, which lies in the path of a lower part of the latter. This spring-projected pin or rod may or may not be used. If used, it will be pressed rearward by a part of the lower end of the oscillator as the upper end of the latter is moved forward by the cam 26 and the roller 36, thus compressing the spring of the pin or rod and cushioning the back stroke of the lower end of the oscillator. The release of the arresting-stop from engagement with the upper end of the oscillator permits the spring pin or rod to shoot forward with the lower end of the oscillator as the upper end thereof moves rearward.

As will hereinafter appear in the description of the starting and stopping mechanism, the spindle carrying the serrated or toothed roller 36, which actuates the serrated or toothed rotary cam of the oscillator, is not geared to the drive-gearing by which motion is transmitted to the main or line shaft, but, on the contrary, is driven by independent means completely under control of the operator, whereby the roller which actuates the rotary cam of the oscillator can be started and stopped or controlled whenever required without regard to the drive-gearing referred to. This is advantageous in that it places the oscillator under better control of the operator and makes it practically independent of the operation of the drive-gearing which rotates the main or line shaft.

In the action of the oscillator when the rotary cam 26 has made one complete revolution it is desirable to stop its motion immediately after the point of greatest diameter of the cam disengages or leaves the continuously-rotating roller. This is accomplished in a very simple manner by constructing a part of the cam-shaft 25 with a flattened portion or seat $25^a$, against which the free end of a curved or bowed spring $25^b$ will bear instantly after the point of the cam disengages or leaves the roller. By this means the motion of the cam will be stopped in accurate position for the subsequent engagement of its lowest or point of least diameter with the roller when the upper end of the oscillator moves rearward.

The oscillator is connected by a link 38 with a crank-arm on a rock-shaft 39, journaled in the top of the magazine, Figs. 1, 2, 3, and 11, and carrying vibrators 40, one for each matrix-bar chamber, for jogging or pressing the matrix-bars well down upon the inclined guide rails or wires 10, by which they are suspended in the magazine-chambers. This is much the same as in the former patent, but the auxiliary fingers $d^3$ of the patent are dispensed with and the vibrators are mounted directly on the rock-shaft, which is connected with the oscillator, whereby this part of the mechanism is simplified and a more positive action of the vibrators on the matrix-bars is obtained.

*The space-bar lever and feeder.*—Instead of the somewhat complicated connections shown and described in the former patent for lifting the space-bars, placing them in their delivery-channel of the magazine, temporarily supporting them therein, and then driving them downward into the assembly-box the following improved and simplified means are provided for effecting the correct feed or delivery of the space-bars into the assembly-box. An elbow or bell-crank space-bar lever 41, Fig. 7, is pivoted at a point near its angle, as at 43, to a bracket 42 on the rear of the magazine. One arm of this lever extends over the top of the magazine and the other arm extends down in rear thereof and is provided near its lower extremity with a rearwardly-projecting arm 44. The vertical arm of the lever is connected with a spring 45, by which this lever-arm is suddenly drawn rearward when released from restraint, for the purpose of throwing the front extremity of the horizontal arm of the lever in a downward direction to drive the space-bar into the assembly-box. Near the lower extremity of the space-bar lever, at the rear of the magazine, is pivoted a space-bar-lever-detaining dog or pawl 46, connected by a rod or link 47 and levers 48 and 49, Figs. 7, 8, and 9, with the lever $50^a$ of the space-bar key 50. The lever 48 is pivoted intermediate its ends, and one end is engaged with the lever 49, while the other end is raised by a spring $48^a$ and is pivoted to the lower extremity of the rod or link 47. The lever 49 is pivoted and connects with the space-bar lever $50^a$, substantially the same as in the former patent.

The front end of the arm of the lever which overhangs the magazine is pivotally connected by a pin and slot with a vertically-movable slide-plate 51, Figs. 7, 13, 14, 15, 18, and 19, having a lifting-horn $51^a$ and a pusher-arm $51^b$. The horn serves to lift the space-bars, one at a time, to register their hooks with the fixed notched retaining-plate 52, and subsequently the pusher-arm drives the space-bars downward through the delivery-channel of the space-bar chamber into the assembly-box. When the space-bar is lifted by the lifting-horn to the fixed notched retaining-plate and is caused to enter the delivery-channel, it falls a short distance and is then arrested and temporarily supported by a friction-spring 53 until the pusher-arm of the slide-plate 51 descends, when the pusher-arm will strike the hooked upper end of the space-bar and drive it swiftly downward into the assembly-box. The vibrating motions of the space-bar lever 41 are effected by the oscillator and by the spring 45. A pivoted pusher 54, Figs. 13 and 18 to 21, pressed forward or to the right by a spring 55, is located in the top portion of the space-bar chamber slightly above the fixed notched retaining-plate 52, and is so constructed that when the slide-plate or pusher 51 rises to lift the space-bar and permit it to pass over the retaining-plate into the delivery-channel the pusher 54 will spring and act upon the upper end portion of the space-bar to push it quickly over the retaining-plate into the delivery-channel, in which it descends by gravity until arrested and temporarily held by the friction-spring 53. As the slide-plate or pusher 51 descends to drive the space-bar down the delivery-channel into the assembly-box an inclined part of the slide-plate acts upon an inclined part of the spring-pressed pusher and presses it backward or to the left, so that its spring is placed under increased tension and it will not interfere with the lifting of another space-bar.

When the space-bar lever is in the position shown in Fig. 7, it is assumed that the slide-plate 51 by its lifting-horn $51^a$ has lifted a space-bar and the latter has been placed in position to be thrust swiftly downward into the assembly-box when the space-key 50 is touched by the operator. When the space-key is actuated, the link 47 is drawn downward, and the detaining dog or pawl 46, releasing the lower end of the space-bar lever, is held down by the lower end of said lever bearing thereupon, and the dog or pawl cannot rise until the lower end of the lever is properly moved forward by the oscillator. When the dog or pawl 46 is drawn down and releases the space-bar lever, the lower end of the latter is snapped rearward by the spring 45 over and against the depressed dog or pawl, and it remains in this back position until a matrix-bar key is touched to release a delivery-gate, whereupon the oscillator, thrown rearward at its upper portion and operated by the cam and roller, is swiftly moved forward at its upper end and resets the delivery-gate. Concurrently therewith a finger $44^a$, Figs. 4 and 10, on a top part of the oscillator, preferably on the innermost side of the upper end 29 thereof, acts upon the projecting arm 44 of the space-bar lever to move it forward and reset the lever in engagement with the dog or pawl 46. After the lower end of the space-bar lever is moved sufficiently forward by the finger $44^a$ the dog or pawl previously held down by the lever snaps up past and engages the lower end of the lever, this action being effected by the spring $48^a$, Fig. 8, connected with the rocking lever 48, as before explained. The action of this spring $48^a$ also restores the space-bar key 50 to normal position. In the last-mentioned movements of the space-bar lever the slide-plate 51 is raised, its lifting-horn $51^a$ elevates or lifts a space-bar, and the pusher 54 forces the latter into the delivery-channel ready to be driven downward into the assembly-box by a subsequent operation of the space-key. After the space-bar key is touched and the space-bar lever is released the lower end of the lever remains back until a matrix-bar key is operated, by which means it is impossible for two space-bars to be delivered and assembled side by side without a matrix-bar between them.

*The assembly-box and ejector devices.*—Under this head I may remark that the matrix-bars are delivered into the assembly-box and are arrested by the stop-bars $56^a$, Figs. 2, 3, 27, 28, 29, and 30, at the proper points to place the required intaglio characters in line, and each of the stop-bars is reset or retracted by the comb-like yoke 56, jointed to the outer end of a slide-bar 57, Figs. 2, 28, 29, and 30, pivoted at its inner end to a link 58, which connects with a lower end portion of the oscillator and is operated as hereinafter set forth in detail.

The manner of arranging the intaglio characters in groups on the matrix-bars and the means for advancing the stop-bars 56ᵃ are fully explained in detail in the former patent, for which reason a more detailed description is not here essential. It is proper to here remark that only those parts constituting the present improvements are herein explained in detail, reference being had to the specification and drawings of the former patent for an explanation of those things which are not herein referred to in detail with regard to their specific construction and mode of operation.

As in the former patent, the matrix and space bars descend, in the order the matrix-keys and the space-bar key are operated, into the assembling or composing box from which each bar as it is received therein is ejected into the longitudinal line-raceway 60ᵇ, in proper position relatively to the line-carriage 60, Figs. 1 and 27.

The inclined guide-plate 59ᵃ, Fig. 27, extending in front of the magazine, at the right thereof, serves to accurately guide the matrix-bars to a common point in the assembling or composing box, where they will be properly arrested at the correct level by the stop-bars 56ᵃ of the machine.

The assembling or composing box is arranged directly beneath the delivery-point of the several channels running at right angles to the magazine-chambers, as before stated. The box comprises the two pivoted jaws 61, Figs. 27, 28, 29, 30, 32, and 33, constructed with angular bent or hooked extremities which when the jaws are in their closed position close or nearly close one end of the box. The ejector-finger 62 is movable horizontally in the box and is constructed with opposite inclines 62ᵃ to act upon inclines on the insides of the jaws 61 and spread them apart. The ejected matrix or space bar is pushed by the ejector past a spring detaining-pawl 60ᵃ, Figs. 28, 29, 34, and 35, the purpose of which is the same as the two spring-hooks i of the former patent—that is to say, to prevent the matrix and space bars moving backward or to the right.

The detaining-pawl 60ᵃ coacts with the line-abutment to hold the line as it is being assembled. This pawl differs from the former detaining-hooks in that it is a single plate having a broad-faced engaging hook exactly vertical to afford an extended base of support, which aids in maintaining the matrix-bars perpendicular. The body of this pawl lies in a recess in the face-plate below the magazine, and its engaging beveled hook or nose is normally pressed outward by springs through a vertical slot in said face-plate into the path of the matrix-bars ejected from the assembly-box.

The ejector is operated by improved and simplified mechanism. It is loosely engaged directly with one arm of a bell-crank lever 63, (best seen in Fig. 28,) which enters a recess or socket in the ejector, the other arm of the lever being pivoted directly to a bar or rod 64, extending back and provided at its rear end with a slot to loosely engage a lower end portion of the oscillator—as, for instance, the cross-pin 59. The bell-crank lever 63 is pivoted at its angle to a vertical pivot-pin to vibrate in a horizontal plane, and the bar or rod 64 is connected with one end of a spring 65, having its other end attached to a lug on the bed-plate of the machine.

The link 58, which extends from the slide-bar 57 of the yoke 56, is provided at its rear end with a slot of a length slightly greater than the slot in the rear end of the bar or rod 64, as shown in Figs. 28 and 30. The cross-pin 59 or a similar part at the lower end of the oscillator passes through the slots in the bar or rod and the link, all in such manner that when the upper end portion of the oscillator moves forward to reset a delivery-gate the lower end portion thereof moves rearward and the cross-pin 59 acts first against the rear end of the slot in the bar or rod 64 to swing the bell-crank lever 63 in the direction necessary to advance the ejector and eject the matrix-bar from the assembly-box, it being understood that the actuation of a key of the keyboard has shifted the required stop-bar into position to arrest the matrix-bar at the proper level to place the desired intaglio character in the line being composed. The back motion of the lower end of the oscillator also causes the cross-pin 59 to act on the rear end of the slot in the link 58 slightly after the cross-piece has acted to move the bar or rod 64 slightly rearward, whereby the slide-bar 57 and the yoke 56 are shifted rearward to reset or push back the projected stop-bar instantly after the matrix-bar is ejected from the assembly-box and the ejector is being retracted to normal position. When the upper end of the oscillator moves rearward and the lower end moves forward, the spring 65 serves to hold the rear end of the slot in the bar or rod 64 firmly against the cross pin or piece 59 at the lower end of the oscillator, so that when the rod or bar stops, as it will when the ejector strikes the right-hand end of the assembly-box, the cross-pin can move forward in the slot of the link 58 and act against the forward end of said slot to move or push forward the yoke 56 for a subsequent back motion to reset a stop-bar.

The two jaws of the assembly-box are spanned by a yoke-shaped bar 66, having its ends extended downward to form shoulders 67. These shoulders contain chambers in which are located springs 68, Fig. 33, which act to close the two jaws of the assembly-box after they have been opened or spread apart by the ejector and the latter is retracted. The shoulders of the yoke-shaped bar serve as stops to limit the opening movement or spreading apart of the two jaws of the assembly-box.

The first matrix-bar of a line being composed, after it is ejected from the assembly-box past the detaining-pawl 60ª, bears against a yielding line-abutment connected with a slide-block or carriage and which is restored to normal position after a line is composed and moves toward the justifying mechanism, as I will now explain.

*The line-abutment and its carriage.*—In the machine disclosed in the former patent, a part of the holder for the line being composed consists of a slide-block which carries two fingers constituting a traveling line-abutment for one end of the line, the fingers being tripped at a predetermined time as the assembled line is carried by the line-carriage to the justifying mechanism to permit the fingers to be forced inward and with the slide-block to resume normal position preparatory to composing a new line. This slide-block carries a spring-pressed pawl coöperating with a rack and is otherwise provided with more or less complicated or intricate devices, which have been materially improved and simplified. The new line-abutment is composed of a solid head 69ª, having two arms or members extending substantially at right angles therefrom and constituting a duplex finger 69. The solid head is pivoted, as at 69ᵇ, to a carriage or slide-block 70, moving in suitable horizontal guides on the inner side of the perpendicular face or front plate lying below the magazine. The two arms or members constituting the duplex finger project through horizontal slots 70ᵇ, Fig. 29, in the face-plate, and the upper and lower acting faces of said finger, against which the end of the line bears, are exactly coincident in a vertical plane. The head 69ª is acted on by a spring 71, which throws the duplex finger outward when it is not held by a locking-dog 72. This locking-dog is pivoted to the carriage or slide-block at a point in rear of the pivot of the head 69ª, and when the duplex finger is projected through the slots in the face-plate to form an abutment for one end of the line being composed the notched extremity 73 of the dog engages the angle 74 of the duplex finger and its head to hold the said finger rigidly projected. The notched end of the locking-dog is positively forced into engagement with the angle 74 by a spring-pressed pin 75, mounted in the carriage or slide-block 70. The carriage or slide-block 70 is pivotally connected by a link 76 with the outer end of a horizontal vibratory lever 77, mounted at its rear end on a stud 78, rising from the bed-plate and around which is coiled a spring 79, engaged with the lever in such manner that as the latter is forced to the left the power or tension of the spring is increased.

After the line of matrices is composed and this line is in charge of the line-carriage, as the latter moves to the justifying mechanism the line-abutment is carried along until the locking-dog 72 strikes a fixed stop-bracket 80, that trips the dog and releases the line-abutment, which is then forced inward by the moving composed line, after which the carriage or slide-block 70, carrying the line-abutment, will be restored to normal position by the action of the spring 79 forcing the lever 77 toward the right-hand end of the machine. When the tail end of the locking-dog 72 leaves the stop-bracket 80 and the composed line has passed the line-abutment, the latter will be thrown outward by the spring 71 and the spring-pressed pin 75 will force the locking-dog 72 into engagement with the angle 74 of the line-abutment to hold it rigidly projected.

The vibratory lever 77 carries a pivoted bell hammer or striker 81, designed to strike a bell or gong 82, suitably supported over the pivoted end of the lever. The bell hammer or striker 81 is provided at its pivoted end with a tailpiece, on which a trip-pawl 83 is so pivoted that when the line is nearly of the proper length the trip-pawl will strike a lug 84, and thus swing the bell-hammer away from the bell and against the tension of a spring 85, connected with the bell-hammer. The continued motion of the vibratory lever 77 to the left causes the pawl 83 to trip past the lug 84, and then the bell or gong will be instantly sounded by the bell-hammer 81 for indicating to the operator that the line is approximately of the proper length. When the vibratory lever 77 moves to the right to restore the line-abutment to normal position, the trip-pawl 83, by its pivotal mounting and inclined face, will easily ride past the lug 84, as will be obvious. The lug 84 is shown mounted upon an adjustable arm 86, arranged at its inner end on the same axis as the vibratory lever 77, the purpose being to adjust the lug 84 relatively to the trip-pawl of the bell-hammer to suit the conditions required when lines of greater or less length are desired—as, for instance, where the line-carriage is made adjustable to compose a line of greater or less length. The tension of the coiled spring 79 can be varied through the medium of the notched disk 87 and the locking-pawl 88.

*The line-carriage.*—The line-carriage 60 (best seen in Figs. 23 to 27) is similar to that disclosed in the former patent and is moved longitudinally on the horizontal guide bar or rail 89 through the medium of the line-carriage lever 90, Figs. 1 and 2, which is actuated by a cam 91 on the main line-shaft 92. The line-carriage lever is pivoted below the bed-plate, as at 93, and comprises two sections, jointed together at 94, one part having its front end engaged with the line-carriage and curved outwardly at its rear, where it is connected by a pull-spring 95 with the rear section of the lever. As the cam 91 is given considerable overthrow motion, the rear section of the line-carriage lever can yield if the front section comes to rest, and the line-carriage can be very firmly pressed into the anvil under the tension of the spring 95 without regard to the length of the line.

In the present machine the latch $l$, trip-pawl $l^3$, and lug $l'$ on the radial arm $II^8$ for locking and releasing the swinging wing of the line-carriage in the former patent are dispensed with and the means for locking and unlocking the wing are materially simplified and improved, as will now be explained. The wing 96 swings vertically on the guide-rod 97 into and out of the line-raceway and is locked in position after being swung upward against the rear or right-hand end of the composed line of matrices through the medium of a horizontal locking-bolt 98, housed in the body of the line-carriage and projected by the action of a spring 99, which bears against the inner end of the bolt. The wing is raised against the tension of the spring 100, when the desired line is composed, through the medium of the radial lever 101 and lever 102, the same as in the former patent. When the wing is raised to the proper position, the spring locking-bolt 98 will snap into a bolt hole or orifice 103 in the wing, thus locking the wing until the line has been shifted to the justifying mechanism and the casting mechanism and is making its return stroke, when it becomes essential to unlock the wing, so that it will be automatically thrown down by the spring 100 out of the path of another line being composed by the operator for enabling the line-carriage to pass to normal position for a subsequent raising and locking of the wing and shifting of the carriage. To accomplish this automatic release of the wing, the locking-bolt 98 is recessed to receive the rounded lower end of a bolt-unlocking lever 104, pivoted between its ends, as at 105, to the carriage-body and having its upper end arranged in the path of a lever-operating device or projection 106, Figs. 1 and 27, on the movable alining bar or rail 107. The upper end of the lever will pass the device 106 when the alining-bar is advanced and the line-carriage is shifted to the left, as is necessary to move it to the justifying and casting mechanisms, but will be acted upon by said device when the alining-bar is retracted and the carriage moves back to normal position, thus causing the locking-bolt to release the wing, whereupon the spring 100 throws the latter downward out of the line-raceway and permits the carriage to move into normal position to take charge of the new line being composed by the operator. The jaw or lug 108, Fig. 27, which coöperates with the wing 96 to carry the line, is sleeved at its upper end on the guide rail or rod 97 and at its lower end on the shaft 110, which extends into the line-carriage body, where the ratchet-hub 109 and ratchet-sleeves 110ª, Fig. 26, are arranged, as in the former patent, in such manner that when the crank-arm 111 on the shaft 110 is raised the jaw or lug 108 is caused to move to the left or away from the wing 96—that is to say, the line-carriage is expanded to loosen the line of matrices and facilitate the depression of the matrix-bars—after the casting operation, the same as in the former monoline. The crank-arm 111 is raised at the casting-point after a type-high printing-bar has been cast by means of the slide 112, having slots through which headed pins 113 pass into the body of the line-carriage. The slide 112 is provided at its left side with a roller-stud 114, which at the proper time is acted on by the incline or wedge-shaped outer end 115 of the transverse sliding bar 116, Figs. 36, 60, and 61, to obtain a primary or first release of the line and enable the depressor 117 (after the movable alining-bar 107 is retracted, as in the former patent) to depress the matrix-bars to a level at their lower ends and push down the upper ends of the lower expander-sections of the space-bars to restore the latter to normal length. The transverse sliding bar 116 is pivoted at its inner end directly to an arm 118, Figs. 60 and 61, rigidly projecting from the auxiliary shaft 119, which latter is like that in the former machine. The auxiliary shaft is provided with a radial arm 120, Fig. 59, connected by a link 121 with an elbow or bell-crank lever 122, actuated by the cam 123 on the main shaft to rock the auxiliary shaft at the proper time.

*The second line-release.*—As before explained, the line of matrices is released at the casting-point for the purpose of enabling the matrix-bars to be depressed for placing their lower ends on the same level and to push down the upper ends of the lower expander-sections of the space-bars. A second release of the line is advisable at the distributer—that is to say, where the matrix and space bars are strung upon the distributing rods or wires hereinafter referred to—in order to facilitate the lifting of the matrix and space bars out of the line-carriage when the distributing-wires rise. To secure this second release of the line, the front of the machine to the left of the keyboard instead of being open, as in the former monoline, is closed by a solid metal panel or plate 124, Figs. 27 and 36, on which is pivoted, as at 125, a gravitating dog 126, located centrally below the distributer and constructed at its outer edge with a lateral bevel or incline 127, which, as the line-carriage moves back to the distributer, acts upon a roller-stud 128, Figs. 24 and 36, extending from the inner side of the slide 112 to raise the slide and elevate the crank-arm 111. The crank-arm, through the shaft 110 and the ratchet-hub and sleeves before mentioned and disclosed in the former patent, causes the carriage to expand or spread and release the line for enabling the matrix and space bars to be easily lifted out of the line-carriage. The gravitating dog 126 is held against swinging to the right or toward the keyboard, but is free to swing to the left or toward the casting mechanism, and therefore as the line-carriage travels to the casting mechanism the roller-stud 128 will ride under the bevel or incline 127 of the dog and lift the latter out of the path of the stud. After the stud passes the dog the latter gravitates to normal position and will operate upon the stud 128 to raise the slide 112 on the return stroke of the carriage, as above explained.

*The primary line-depressor.*—The primary line-depressor 117 (best seen in Fig. 36) comprises a broad metal plate mounted on the upper end of the skeleton sliding frame 129, which moves in vertical guides and at its lower end is connected by a link 130, Fig. 59, with the outer end of a curved lever 131, pivoted at 132 to a bracket-arm extending from the front plate or panel of the machine. The lever 131 is provided with a tailpiece 133 in rear of its pivot, connected by a slotted link 134 with an arm 135, rigidly secured to the auxiliary shaft 119, the construction being such that the depressor is raised and lowered by the rocking of the auxiliary shaft. The auxiliary shaft, as in the former machine, operates the transverse sliding bar 116 to release the line, retracts the alining-bar 107 in the anvil 136, and draws down the depressor 117. The devices for retracting the movable alining-bar are located in the anvil, Figs. 1 and 36, and are operated by the vertical shaft 137, crank 137$^a$, and rod 138, connected with the auxiliary shaft.

The upper end of the vertical shaft 137 is engaged by an eccentric-pin with a slot in the left-hand extremity of the movable alining bar or rail 107, and when the shaft is turned the bar or rail is moved longitudinally by oblique slots and pins and is advanced or retracted at the proper intervals, according to the direction in which the shaft is turned by its connection with the auxiliary shaft.

*Safety or secondary line-depressor.*—To insure the correct depression of all the matrix-bars, if from any cause one or more should not be accurately leveled after the printing-bar has been cast, the primary line-depressor 117 is depressed and the line is moved by the line-carriage 60 back to the distributer, hereinafter described, and there is provided a safety or secondary depressor 159, Figs. 27, 36, 41, 43, and 45, composed of a broad plate of metal attached to the mold-carrying frame 160 and having a beveled under side to act upon the flat upper portions of the matrix-bars to level any one or more that may possibly not be properly leveled as the line is moved from the casting-point to the distributer. The object of this is to place with certainty all the matrix-bars in exact alinement at their lower ends, which is important to secure the correct position of the hooks on the matrix-bars and accurate stringing of the same on the distributing-wires of the distributer. This safety or secondary depressor is fixed to the end portion of the mold-carrying frame opposite the pivoted end of the latter and is projected and retracted, as will hereinafter appear in connection with the description of the operation of the mold, the mold-carrying frame, and the casting-pot.

*The justifying mechanism.*—The justifying mechanism, *per se*, by which the space-bars are operated to expand the line to exact length, is constructed and operates substantially the same as in the former monoline, and comprises a shoe 139, Figs. 27 and 36, secured to a base-plate 140, movable vertically between the guide-legs 141 and 142 and connected, as in the former patent, with a spring yielding link 145, Fig. 2, attached to a pivoted lever 146, engaged with and operated at the required intervals by the cam 147 on the main shaft.

The overhanging or raised flange 139$^a$, Fig. 27, on the fixed alining bar or rail 139$^b$ to extend over the usual lugs on the space-bars at the justifying-point, is at the left-hand end braced by a perpendicular brace-post 139$^c$, whereby the flange will successfully resist all strains and upward pressure exerted on the space-bars.

In operative connection with the justifying mechanism there is provided mechanism for operating a loose-line signal and a pot cut-off, which latter prevents the flow of metal to the mold if a line of matrix and space bars should be loose—that is to say, of such length that the upward motion of the movable parts of the space-bars will not properly expand the line and the justifying-shoe unduly rises, which is permitted by the spring-link 145. When this occurs, the signal and pot cut-off will be operated, as I will hereinafter explain.

*The casting-pot, mold, and mold-frame.*—In the former monoline composing-machine the casting-pot comprises a surrounding jacket 148, entirely open at its lower end, and the bottom wall of the well in which the plunger operates and also a portion of the lower side of the metal-delivery channel or throat leading to the mold are exposed to the direct action of the heating medium, such as the flame of a gas-burner, in consequence of which the metal at the bottom of the well and in the lower portion of the delivery channel or throat lying inside the pot is heated to a higher degree than the remaining metal in the pot and well. To avoid this disproportionate overheating of the metal in the well and a part of the delivery channel or throat, the well 149, Fig. 40, is submerged in the pot 150 in such manner that the well is suspended with its bottom wall elevated above and remote from the bottom wall of the pot, whereby a body of molten metal will lie in the pot between the bottom wall of the latter and the bottom wall of the well, by which means the bulk of metal in the pot and that in the well and delivery channel or throat are maintained approximately at equal temperatures, and therefore the metal which flows into the mold to produce the printing-bars is always of a uniform temperature, by which better castings are obtained and the best results are secured.

The casting-pot is constructed with flanges at its top, Fig. 41, which rest on the upper edge of the pot-jacket 148 for suspending the pot therein, and through the medium of set-bolts 150$^a$, carried by the jacket, the pot is adjustable in two planes at right angles to each other to accurately position it to suit whatever conditions may be required. The jacket is supported at its front by roller-bearings 150$^b$ to facilitate its back-and-forth sliding motions.

The plunger of the pot is operated in the usual manner through the medium of a cam 151, Fig. 1, on the main shaft acting on a lever 152, which, after being raised by the cam, is quickly drawn downward by a spring 153, as is well known. The cam 154 on the main shaft serves to move the pot to and fro, and for this purpose the cam is constructed at its sides, as in the former patent, to engage antifriction-rollers on the ends of the arms 155, extending rearward from the pot-jacket. The pot-operating cam 154 is constructed with two acting-surfaces 156 and 157, one of which acts on the roller 158 to move the pot to and against the mold for locking up the line and casting the printing-bar, while the other acting-surface acts to subsequently advance the pot and press forward the mold-carrying frame 160 for the purpose of placing the safety-depressor 159, Figs. 27, 36, 41, 43, and 45, before referred to, in proper position to insure leveling the matrix-bars as the line is moved by the line-carriage back toward the distributer. The safety-depressor, as before stated, is composed of a broad flattened piece of metal having a beveled under side. This piece of metal is rigidly secured to the mold-carrying frame 160, which is pivoted at one end, as at 160$^a$, as in the former patent. Instead, however, of this frame being moved back and forth through the medium of a set of levers and a cam on the main shaft, as before, it is, according to the present improvements, moved back and forth by a direct connection with the casting-pot. To secure this result, the casting-pot is provided at one side with a projection 161, Figs. 41 and 43, to which is secured an arm 162. The end of the mold-carrying frame opposite its pivoted end 160$^a$ is provided with a bracket 164, pivotally connected with the arm 162 through the medium of a link 165. It will be obvious, therefore, that as the pot is moved back and forth the mold-carrying frame is correspondingly moved back and forth by very simple devices.

The right-hand end of the mold-carrying frame is constructed with a guide-notch, Fig. 45, movable in engagement with a fixed guide-flange 160$^b$ for guiding and steadying the motions of the said frame. The safety-depressor 159, before referred to, secured to the mold-carrying frame near the end opposite its pivoted end, is moved forward each time the mold-carrying frame is advanced by the casting-pot. This depressor passes through an orifice in a front part of the machine and can project some distance therefrom. When the pot advances to lock up the line of matrices and effect the casting of the printing-bar, the safety-depressor performs no function; but on the second forward stroke of the casting-pot the safety-depressor, being projected, will lie in such position that as the depressed line of matrices is moved by the line-carriage toward the distributer the safety-depressor will press down any and all matrix-bars not properly leveled or pressed down into correct position for stringing upon the distributing-wires of the matrix-bar distributer, hereinafter explained.

The arms 155 of the pot-jacket move back and forth on antifriction-rollers 155$^a$, and the shaft 158$^a$ of the roller 158 passes through slots in the arms 155, Fig. 44, and is carried by arms 155$^b$, Fig. 41, engaging the pot-jacket and made adjustable for moving the shaft to adjust the roller 158 relatively to the acting-surfaces of the pot-moving cam on the line-shaft. The arms 155$^b$ are made adjustable by suitable screw-threads thereupon.

As here shown, the pot-jacket moves back and forth on roller-bearings, and the roller 158 between the pot-arms is provided internally with roller-bearings for the purpose of obtaining a smooth working of the parts. The mold 166, Fig. 50, is movable longitudinally in a slot in the mold-carrying frame 160; but it is operated by the improved and simplified means hereinafter explained. When the pot moves up to the mold after the line of matrices has been placed by the line-carriage in proper relation to the mold, the forward thrust or pressure of the pot upon the mold forces all the parts closely together, locks them up, and tightly clamps the line between the mold and the anvil 136, which latter, as in the former patent, is made strong and substantial to successfully resist all pressures and strains. When the parts are clamped as above stated, the plunger of the well in the pot is operated to eject the metal into the mold, after which the pot-cam retracts the pot, the mold-carrying frame and mold are drawn rearward to withdraw the casting from the matrices, the mold moves to the ejector, and immediately the pot-cam again moves the pot forward to advance the mold-carrying frame parallel with the trimming-knives and to thrust forward the safety-depressor 159 for insuring the leveling of the previously-depressed matrix-bars. The frame 160 carries a back trimming-knife 160$^d$, Figs. 1, 45, and 50, to remove surplus metal from the bases of the castings as the mold moves to the ejector.

*The mold-shifting devices.*—The mold 166, Fig. 50, is shifted to and fro in the slot of the mold-carrying frame to convey the printing-bar from the casting-point to an ejector-blade 167, Fig. 1, reciprocated at the proper interval by the cam 168 on the main shaft and by which the printing-bar lying in the mold is ejected between the trimming-knives 169 for dressing or smoothing its sides. Instead, however, of employing a system of levers and toothed sectors underlying the bed-plate of the machine to shift the mold, as in the former patent, this is now effected through the medium of a single lever 170, Figs. 1, 46, 49, and 50, which overlies the bed-plate of the machine and is pivoted between its ends thereto by a vertical pivot, as at 171. The pivot of the lever is near the main shaft, and the lever possesses a long and a short arm. The short arm is provided with a roller-stud 172, engaging the lever-operating cam 173, similar to that in the former machine. The outer extremity of the long arm of the lever is pivoted to one end of a link 174, jointed at its other extremity to a part of the mold, so that when the lever is vibrated in a horizontal plane the mold is shifted back and forth, as will be obvious.

*The trimmer-wiper.*—In the practical use of the monoline composing-machine simple means are devised for cleaning the trimming-knives as the mold moves in its carrying-frame without, however, sweeping the trimmings from the knives in opposite directions. To accomplish this, the outer end portion of the mold-shifting lever 170 is provided with an upright post or stud 175, Fig. 46, which enters a somewhat enlarged rectangular opening 176, Fig. 49, in a flattened plate 177, attached and projecting rearwardly from a wiper carrier or slide 178, Figs. 46, 47, 48, and 49, sleeved upon and traveling lengthwise of a guide-rail 179, secured at its ends in lugs rising from the top edge of the mold-carrying frame. The wiper carrier or slide is provided at its front with a horizontal stud 180, on which is pivotally mounted a pendent arm 181, having its lower end portion provided with a flexible wiper 182. This wiper may be of any construction and of any material suitable for the purpose in hand—that is to say, for cleaning the trimming-knives after each printing-bar has been ejected between the same. The pivoted wiper-arm 181 is provided at its upper end with a tailpiece connected with one end of a spring 183, which at its other end is attached to the wiper carrier or slide 178, the spring serving to force the wiper-arm to a perpendicular position, as shown in full lines, Fig. 47. When the wiper-arm is perpendicular, or approximately so, and is making its wiping stroke, it is held or supported by a stop-lug 184 on the wiper carrier or slide. The wiper-arm is provided with a leaf-spring 185, secured at its upper end by a screw or otherwise, as at 186, and provided at its lower end with a lateral pin 187, which freely passes through an orifice in the wiper-arm and normally projects beyond the rear surface thereof to travel upon the upper edge of a horizontal guide-strip 188, attached to the mold-carrying frame above the slot, in which the mold is shifted to and fro. The guide-strip 188 is provided at one end—that is to say, the end nearest the pivoted end of the mold-carrying frame—with an incline 189, extending to and merging in the horizontal top edge of the guide-strip. The end portion of the guide-strip having the incline is constructed at a point opposite the incline with a beveled portion 190, designed to act upon and press outward the pin 187, as will hereinafter appear. In the normal position of the mold-operating lever the wiper-arm 181 stands substantially perpendicular, as shown by full lines, Fig. 47, and when the mold is shifted from the trimming-knives to the casting-pot the pin 187 on the lower end of the leaf-spring will ride up the incline 189 of the guide-strip 188. As the wiper carrier or slide follows the motion of the mold the wiper-arm will be held in an inclined position by the pin 187, resting against and traveling upon the upper edge of the guide-strip, whereby the wiper 182 is held above the trimming-knives and will not act upon the same as the wiper travels toward the casting-pot. The pin 187 will, however, eventually ride off the guide-strip, whereupon the spring 183 will swing the wiper-arm to the perpendicular position indicated in dotted lines, Fig. 47. On the return stroke of the wiper or when the mold is moved from the casting-pot to the trimming-knives 169 for the ejectment of a cast printing-bar the wiper will sweep over the edges of the knives and sweep all trimmings therefrom in a direction toward the left-hand end of the machine. By this means the wiper only sweeps trimmings from the knives in one direction, and the accumulation of trimmings at both ends of the knives is thereby avoided. In order to enable the mold to travel a slightly-greater distance toward the casting-pot than the wiper carrier or slide travels when the mold-shifting lever swings toward the casting-point, the enlarged opening 176 in the plate 177 is provided. It will be obvious that when the mold-shifting lever commences to move it can move a limited distance in the opening 176 before motion is imparted to the wiper carrier or slide, and, therefore, the mold commences to move previous to the wiper, which enables the guide-rail 179 to be shortened and not necessarily be made of a length coextensive with the extent of movement of the mold. The enlarged opening 176 also enables the wiper carrier or slide 178 to move in a rectilinear path on the guide-rail 179, while the outer extremity of the shifting-lever travels in the arc of a circle. In the operation of the mold as the justifying-shoe 139 rises the mold-shifting lever commences to swing and the mold to slide in a direction from the trimming-knives to the casting-pot. The wiper carrier or slide commences to move slightly after, as it does not require to move the same distance as the mold. The mold moves to the pot and the line-carriage moves to the mold, where the printing-bar is cast. The mold then makes its back stroke while the line-carriage remains motionless and the line is released to be depressed by the primary depressor 117.

*The galley.*—In the former monoline-machine the printing-bars are superimposed successively in a vertical column or stack upon a galley moved through the medium of a duplex pawl-and-ratchet mechanism which is necessarily somewhat complicated to secure correct action of the parts. This is avoided by the present invention, and a novel, simple, and efficient galley is provided, which can be readily removed and replaced and wherein the printing-bars are accumulated in a horizontal column. The galley is best shown in Figs. 1, 36, 57, and 58, and comprises a rectangular box-like receptacle 191, the rear wall of which is somewhat higher than the front wall, so that while the bases of the printing-bars are squarely supported by a solid wall the upper end portions of the edges bearing the relief characters are exposed. The galley-box is mounted on a horizontal bracket or shelf 192, projecting from the front of the machine and having at its lower side a leaf-spring 193, attached at one end and provided near the opposite end with a locking-pin 194, extending upward through an orifice in the bracket or shelf and entering a pin-hole in the base of the galley-box, whereby the latter is locked in position, but can be readily removed by pressing downward on the leaf-spring to disengage the locking-pin from the galley-box, as will be obvious. The galley-box contains a sliding abutment or block 195 for one end of the column of accumulating printing-bars. The base of the abutment or slide-block is provided with a friction-spring 196, pressing against the bottom of the galley-box for retarding to a certain extent the free sliding motion of the abutment or block and preventing it moving too far when a printing-bar is introduced into the column being accumulated. The bracket or shelf 192 is provided at its lower portion with a bearing 197, in which is mounted a short rock-shaft 198, having at its outer end an attached upwardly-projecting finger 199, rising through and vibrating at intervals in slots in the bracket or shelf and the bottom of the galley-box. To the inner end of the rock-shaft is attached a rigid tappet-arm 200, extending upwardly to a point directly in front of the mold-carrying frame. The upper extremity of the arm 200 lies in the path of a tappet-dog 201, pivoted to the sliding mold and having a tailpiece 202, which normally rests against a pin, so that while the dog is free to swing to the left it will be held when substantially perpendicular against moving to the right by means of the pin. When the mold is shifted from the trimming-knives to the casting-pot, the dog 201 will ride over the upper end of the tappet-arm; but on the return of the mold back to the trimming-knives the dog 201 will strike the upper extremity of the tappet-arm, and as the dog is now held rigid the tappet-arm will be swung toward the left and the vibrating finger 199 correspondingly swung to push the column of accumulating printing-bars longitudinally of the galley-box for making room for another printing-bar after the vibrating finger has been restored to normal position, which is preferably effected by a suitable spring 203.

*The distributer.*—In the monoline composing-machine constructed according to the former Letters Patent one set of the swinging distributer-levers which carry the horizontal distributing rods or wires are pivotally connected at their tail ends to slide-blocks, which accurately fit and work in horizontal grooves formed in a vertically-movable slide-bar. This construction is such that there is no possibility of a release and loose play of the levers during their rising-and-falling motions between their highest and lowest positions. In consequence of this the horizontal distributing-wires, located one above another when lowered, are liable to unduly clamp or press upon the hooked ends of the matrix-bars strung upon the wires immediately after the latter commence to rise. The effect of this is that the matrix-bars are more or less rigidly held at their hooked ends, and sometimes they are thus caused to stand more or less out of perpendicularity until the distributing-wires commence to separate and spread into an approximately horizontal plane. Under such conditions the matrix-bars, suddenly released from the holding effect of the distributing-wires, will oscillate or swing back and forth relatively to the front of the machine, with the result sometimes that, owing to the oscillating or swinging motions of the suspended bars, they will not be pushed into the magazine-chambers by the distributer-pusher, which forms a part of the distributing mechanism, but will strike the edges of the partitions of the magazine-chambers and perhaps fall to the bed-plate of the machine, thus interrupting the work of the operator and causing the loss of more or less time. To entirely avoid this interruption to the operator, which, although it may not be frequent, is vexatious when it occurs, devices are provided whereby the distributing rods or wires after they rise a short distance from their lowest position will not bear firmly against the hooked ends of the matrix-bars strung thereupon, but will be slightly released and be susceptible of a limited play or loose motion, in contradistinction to being held substantially rigid relatively to one another, until they reach the point where they commence to separate and spread into an approximately horizontal plane. The object of this release and play or loose motion is to avoid the gripping or holding of the hooked ends of the matrix-bars by the distributing-wires, whereby said bars will always be suspended perpendicularly and will not unduly oscillate or swing back and forth as the distributing-wires rise to and reach their highest position. Therefore when the distributer-pusher operates instead of acting upon oscillating or swinging matrix-bars it will encounter these devices while they are motionless or practically so.

The result above stated is accomplished in the manner which will now be specifically described.

The distributing mechanism is located, as in the former machine, between the justifying and the casting mechanisms, and the distributer is so operated that it meets the line of matrix and space bars as the line is carried back by the line-carriage. The distributing-wires 204 (best seen in Fig. 37) are suspended, respectively, from the outer ends of carrying-levers 205, and there are nine distributing-wires and nine pairs of levers, the same as in the former patent, one distributing-wire receiving the space-bars and the others the eight species of matrix-bars. The pairs of levers are mounted upon horizontal shafts 206, arranged in suitable bearings rising from the bed-plate of the machine. The shafts are located one above another in approximately the manner represented in Fig. 37 to obtain the correct throw, so that when the pairs of levers are lowered at their outer ends the distributing-wires will correctly overhang the line-raceway and be arranged one above another in an approximately perpendicular plane. The levers at one side are provided with arms or tailpieces 207, having lateral roller-studs 216, which, with one exception hereinafter stated coöperate with lever-release blocks 208, fixed in horizontal grooves in the vertically-movable slide-bar 209. This bar has at its upper end an arm 210, connected by a spring-link 211 with a pivoted link 212, engaged with a cam 213, for the purpose of raising and lowering the slide-bar, and thereby swinging the distributer-levers in the arc of a circle. If they are lowered, as indicated by dotted lines, and the slide-bar is depressed, the levers will be raised and arrested at the exact point by a stop-plate 205$^b$, Figs. 1, 38, and 39, to place the distributing-wires in correct position for distribution of the matrix and space bars. If the levers are elevated and the slide-bar is raised, the levers will be lowered and the distributing-wires placed one above another in correct relation to the line-raceway, as in the former patent. The lever-releasing blocks are cut away at their lower sides for a portion of their length to provide horizontal acting surfaces 214 and release-surfaces 215, the latter being formed in such manner that they are each at a slightly-higher elevation than the horizontal acting surface leading thereto, whereby such cut-away surfaces 215 serve to slightly release the tail ends of the levers, as will hereinafter appear. The horizontal acting surfaces 214 are parallel with horizontal acting surfaces 217, forming fixed parts of the slide-bar, the construction being such that as the slide-bar descends to raise the distributing-wires 204 from their lowest to their highest position the roller-studs will ride off the horizontal acting surfaces 214 onto the cut-away release-surfaces 215. At this time instead of the tail ends of the distributing-levers being held in fixed relation to the slide-blocks, as in the former machine, the distributer-levers are susceptible of a certain amount of play or loose motion, and likewise the distributing-wires which receive the matrix-bars have a loose play relatively to one another, which prevents them from clamping, gripping, or pressing upon the hooked upper ends of the matrix-bars strung thereupon. By this means the oscillating or swinging motions of the matrix-bars hereinbefore referred to as produced by the clamping or gripping action of the distributing-wires as they rise to the distributer-pusher are practically avoided, and consequently when the distributer-pusher plate 218, Figs. 38 and 39, moves to the right to push the matrix and space bars from the distributing-wires the bars will not strike the edges of the magazine-partitions, but will glide smoothly into their proper chambers in the magazine. The release of the tail ends of the distributer-levers by reason of the roller-studs 216 riding onto the release-surfaces 215 occurs immediately after the distributing-wires commence to rise.

The two uppermost distributer-levers carry the distributing-wire which is the highest one when all the distributing-wires are lowered to stand in an approximately perpendicular plane over the line-raceway, and it receives all the space-bars. The tail end of the uppermost distributing-lever is or may be pivoted to a slide-block, the same as in the former patent. The release of the tail ends of the distributer-levers occurs only when the distributing-wires are between their highest and lowest positions, in both of which positions the levers are held or locked as regards the loose motion referred to, as it is advisable to maintain the horizontal distributing-wires motionless and steady when the matrix and space bars are strung thereupon and pushed therefrom.

The distributer-pusher plate 218, Figs. 38 and 39, is attached to two horizontal guide-rods 219, movable longitudinally of the machine in sleeved bearings 220, supported in an elevated position, so that when the distributing-wires are elevated the pusher-plate, when advanced, will push the matrix and space bars from said wires. The two guide-rods are connected together by a cross-head, to which is pivoted one end of a link 221, having its other end pivoted to the upper extremity of a lever-arm 222, rising from and secured to a rock-shaft 223, journaled in suitable bearings under the bed-plate, the lever projecting through and working in a slot in the latter. The rock-shaft is provided at one end with a crank-arm 224, having a roller-stud 225 engaging a cam 226 on the main shaft in such manner that at the required intervals the shaft 223 will be rocked to swing the lever 222 and advance the pusher-plate 218 in the direction necessary to push the matrix and space bars from the distributing-wires into their respective magazine-chambers. The top edge of the pusher-plate is stepped to provide pusher-fingers 227, which pass, respectively, beside the distributing-wires and remove the matrix and space bars therefrom. The cam 226 and connections which actuate the distributer-pusher are so properly timed in their movements relatively to the motions of the distributer-levers that before the distributing-wires start to descend the pusher-plate is retracted to normal position for a subsequent movement.

*The recasting mechanism.*—It is considered advisable and advantageous to provide the monoline composing-machine with mechanism whereby any desired number of printing-bars can be cast from one and the same line of assembled matrices while this line remains motionless at the casting-point. To accomplish this, the motions of the justifying mechanism, the line-carriage, the distributer, the distributer-pusher, the vertically-movable depressor, the movable alining-bar, and the line-releasing devices located at the casting-point should be discontinued when the line is at the casting-point. For this purpose the cams which operate the line-carriage, the justifying mechanism, the distributer, the distributer-pusher, the first or main line-release, the main line-depressor, and the movable alining-bar are fixed to a sleeve 228, Figs. 1, 51, and 52, adapted to rotate on or with the main or line shaft. In a portion of the cam-sleeve is arranged a longitudinally-sliding locking-bar 229, constructed at one end to enter a notch 230, formed in a collar 231, rigidly fixed to the line-shaft near one end of the sleeve. This locking-bar is projected or pressed outward by a spring 232 to automatically engage the notch in the collar. While the locking-bar is engaged with the collar, the machine will operate in the usual manner and cast a single printing-bar from each line of matrices presented to the casting mechanism; but for recasting purposes this locking-bar can be thrown out of engagement with the notch in the collar through the medium of a bevel or incline 233, formed on the arm 234 of an elbow or bell-crank lever which is pivoted at its angle, as at 235, to a support in rear of the sleeve. The arm 234 of the bell-crank lever is curved to extend in a direction around the rigid collar, while the other arm 236 of the lever extends upwardly and is pivoted to the rear extremity of a rod 237, Figs. 1, 53, and 54, extending over the machine to the front thereof and having a suitable handle within convenient reach of the operator. The recasting-rod 237 is normally pushed rearward, and the curved arm 234, having the incline 233, is therefore normally lifted out of the path of the locking-bar 229 to enable the cam-sleeve to rotate with the main shaft, during which the usual operation of the machine takes place—that is to say, a single printing-bar is cast from or by each line of matrices. To release the locking-bar 229 from the notched collar 230 for the purpose of recasting any desired number of printing-bars from a line of matrices, the recasting-rod 237 is drawn outward by the operator, and the curved arm 234 of the bell-crank lever is thrown downward to rest upon the periphery of the rigid collar 231, thereby placing the bevel or incline 233 in the path of a portion of the outer end of the locking-bar. When the locking-bar, turning with the cam-sleeve, reaches the bevel or incline, the bar will be pushed inward and out of engagement with the notched collar, whereupon the cam-sleeve will cease to rotate, and the motions of the line-carriage, the justifying-shoe, the distributer, the primary depressor, the movable alining-bar, and the first line-releasing devices are suspended until the recasting-rod is pushed rearward to move the lever-arm 234 out of the path of the locking-bar, which enables the latter to spring outward and snap into the notch in the rigid collar. The motion of the parts, suspended as above mentioned, will then continue at the proper time. During the time the locking-bar is disengaged from the rigid collar the operation of the casting, ejecting, and trimming mechanisms continue, the line of assembled matrices remains motionless in front of the mold, and any desired number of printing-bars can be obtained from this line of matrices, as will be obvious.

*The pot cut-off and loose-line signal.*—The base-plate 140, carrying the justifier-shoe 139, is provided at its lower end, some distance below the shoe, with an arm or dog 239, Figs. 27, 36, 55, and 56, pivoted at one end and slotted at the other for the passage of a screw 240 for adjusting the slotted end of the arm or dog vertically. The arm or dog is constructed with a rounded upward projection 241, adapted to bear against the end of the long arm 242 of a bell-crank lever 243, secured at its angle to the outer end of a transversely-arranged rock-shaft 244, journaled in and extending through the solid front panel or plate 124 of the machine. The short arm 245 of the lever 243 normally bears against the upper edge of a trip-pawl 246, pivoted at one end, as at 247, to the lower end portion of the guide-leg 141, which guides one edge of the base-plate, to which the justifier-shoe is attached. The trip-pawl is cut away or recessed in its upper side, as at 248, and is connected with one end of a spring 249, having its other end attached to a pin on the front panel or plate of the machine. A lever-arm 250 is secured to the inner end of the rock-shaft 244 and lies along the inner side of the front panel or plate 124. This lever is connected at its left-hand extremity by a link 251 with a swinging pot-cut-off plate 252, pivoted at one end, as at 253, to the mold-carrying frame 160. The link 251 connects with the cut-off plate at one side of the pivot of the latter, and the cut-off plate is composed of a comparatively thin plate of metal, preferably brass, of sufficient width to entirely close the mouth of the casting-pot when the cut-off plate is shifted directly in front of said mouth, as indicated by full lines in Fig. 55. The cut-off plate is designed to be lowered into position to close the mouth of the casting-pot, as will hereinafter appear, immediately before the pot reaches a position to lock up the mold and line of composed matrices. The vibratory lever 250 is connected to one end of a spring 254, which at its other end is attached to the rear of the front panel or plate 124, the tendency of the spring being to raise the long arm of the lever and thereby elevate the pot-cut-off plate to normal position, as in dotted lines, Fig. 55, where it will not prevent or obstruct the free flow of metal from the pot-mouth into the mold.

The base-plate 140 and the justifier-shoe 139 can rise the usual distance to operate the space-bars for expanding and justifying a correct line without operating the bell-crank lever 243; but if the line of assembled matrix and space-bars be loose or of a length insufficient to be expanded by the space-bars the distance necessary to make a tight line in the line-carriage the base-plate and the justifier-shoe carried thereby will unduly rise, because there is insufficient resistance to the upward motion of the justifier-shoe, as is the case in a correct or tight line, such undue upward motion of the base-plate and justifier-shoe being rendered possible by the presence of the spring yielding link 145. When the base-plate 140 unduly rises, the rounded extension of the arm or dog 239 will strike the long arm of the lever 243 and by raising the same force the short arm 245 to the right until it passes off the upper edge of the trip-pawl to the cutaway or recessed portion 248, whereupon the pawl will snap or spring upward from the position indicated by dotted lines in Fig. 55 to the position shown in full lines, and the short arm of the lever will bear against the shoulder formed by the recess in the pawl. As the trip-pawl springs upward a spring-pressed trip-dog 255, pivoted to the pawl, acts upon a tappet 256, provided at the outer end of a rock-shaft 257, to sound the audible signal, as will hereinafter appear.

The upward motion of the long arm 242 of the bell-crank lever 243 turns the rock-shaft 244 in the direction necessary to throw the lever 250 in a downward direction, thereby pulling the pot-cut-off plate down and placing it in position to cut off or close the mouth of the casting-pot when the pot is advanced and its plunger is operated. It will be obvious, therefore, that the metal will not flow to the mold, which would be very objectionable if a loose line of matrices or no line were presented to the casting mechanism. The rock-shaft 244 is journaled in and extends through the front panel or plate of the machine, and the inner end of the rock-shaft is provided with a bell hammer or striker 258, designed to strike and sound a bell or gong 259, supported in suitable manner at the inner side of the said front panel or plate. The rock-shaft is provided with an arm or lug, to which is attached one end of a spring 260 in such manner that when the trip-pawl 246 snaps or springs upward and operates the tappet 256 the rock-shaft will be turned, the spring 260 will be stretched, and the bell hammer or striker will be moved away from the bell; but the instant the trip-pawl slips past the tappet the spring 260 will turn the rock-shaft in the reverse direction, restore the tappet to normal position, (indicated by full lines in Fig. 55,) and cause the hammer or striker to sound the bell or gong, thus giving the signal to the operator which indicates that a loose line is in the line-carriage at the justifying-point, whereupon the operator can instantly stop the machine or permit it to continue its motions, as the pot cut-off will lie in a position to close the pot-mouth and prevent the passage of metal to the mold. The trip-pawl is provided on its outer side with a lateral pin 261, adapted to be acted upon by a suitable dog 262, Figs. 23, 24, and 25, pivoted to the inner side of the line-carriage in such manner that when the line-carriage subsequently moves from the casting-point back to normal position the pivoted dog will be held against swinging and act upon the pin 261 to force the trip-pawl 246 downward to be engaged and held down by the short arm 245 of the lever 243, the spring-dog 255 yielding to permit it to pass the tappet 256. The parts are thus reset, as shown in full lines, Fig. 55, for a subsequent operation if a loose line should exist in the line-carriage after the justifying-shoe is operated.

The arm or dog 239 on the base-plate of the justifying-shoe is adjustable, as before set forth, to regulate its position relatively to the long arm of the bell-crank lever 243 to suit the conditions required.

This pot-cut-off and loose-line-signal mechanism is simple, efficient, and satisfactory in practical operation, and is a desirable improvement, which materially increases or promotes the efficiency of the monoline.

It will be obvious that the pot-cut-off mechanism can be used independent of the loose-line-signal devices—that is to say, the latter can be omitted without affecting the operation of the pot-cut-off mechanism. Further, the loose-line-signal devices can be operated if the pot-cut-off plate is dispensed with. Therefore the case is not confined to the employment of the signal devices in connection with the pot-cut-off mechanism nor to the employment of the pot-cut-off mechanism in connection with the loose-line-signal devices, as either or both may be employed; but it is advisable to employ both in substantially the manner described and shown, as by this means the usefulness of the machine is enlarged.

*The starting and stopping mechanism.*—The main or line shaft of the machine is placed under control of the operator by devices, some of which are similar to those disclosed in the former patent. As regards the automatic stopping of the main shaft at the end of each cycle of motions and the means for operating the roller which actuates the cam on the oscillator, desirable and advantageous improvements have been made which materially simplify the machine and contribute to making it certain, effective, and reliable in operation.

The spindle 271, Figs. 1 and 4, which corresponds to the shaft on which the pinion S³ in the former patent is loosely mounted, instead of being geared to the drive-gearing of the machine, as before, is provided with a loose pulley 272, driven by suitable power—as, for instance, by a belt connection with an overhead driving-shaft. The hub of the pulley is provided with notches, as at 273, designed to be engaged by projections, as at 274, on a handle-knob 275, which rotates with the spindle, but is movable longitudinally thereof, in such manner that if the knob-handle be pushed in to engage its projections with the hub of the loose pulley the latter will be caused to rotate with the knob-handle and the spindle 271. The spindle carries the serrated or toothed roller 36, which operates the serrated or toothed rotary cam 26, as hereinbefore explained.

It will be seen from the foregoing that the spindle carrying the roller which actuates the cam of the oscillator is driven by driving mechanism entirely independent of and disconnected from the drive-gearing or mechanism which transmits motion to the main or line shaft. The object of this, as hereinbefore stated, is to simplify this part of the machine, render it certain and reliable in operation, and place the roller under control of the operator without any gear connection with the drive-gearing which operates the main or line shaft.

The rotation of the main or line shaft is effected through the medium of a driven pulley 276, Figs. 1 and 63, the shaft of which is provided with a pinion 277, engaging a gear-wheel 278, attached to a tubular shaft 279, Fig. 62, supported in suitable bearings. The tubular shaft also carries a loosely-mounted pinion 280, geared to the toothed drive-wheel 290 on the line-shaft 92, the same as in the former patent. The pinion 280 has a hub which enters the annular hub of the gear-wheel 278 and is formed on its inner end with teeth 281, constituting one member of a clutch. The other clutch member is composed of a toothed collar 282, loosely mounted on the tubular shaft and placed within the annular hub of the gear-wheel 278. The toothed collar 282 is secured to a clutch-shaft 283, arranged within the tubular shaft and pressed outward by a spring 284, acting against its inner end. Instead of providing the projecting end of the clutch-shaft with a grooved collar to engage the bifurcated end of the clutch-operating lever 285, as in the former machine, the inner end of the clutch-shaft 283 is provided with a rounded extremity bearing directly against the front end of the clutch-operating lever 285, which is pivoted at its rear end, as at 287, and is provided at its left-hand side with a lateral abutment or stud 288, designed to coöperate with a stop dog or pawl 289, pivoted to the toothed drive-wheel 290 on the main shaft. The dog or pawl is pivoted to the right-hand face of the toothed drive-wheel, as at 291, as best seen in Fig. 64, and at its outer end it is constructed with a segmental slot 292, through which a pin 293 passes into the toothed drive-wheel. The pawl is provided with a projecting finger 294 and is connected to one end of a spring 295, which at its other end is attached to the right-hand face of the toothed drive-wheel. The action of the pawl will hereinafter appear.

The clutch-operating lever 285 may be pushed to the right to force the clutch-shaft 283 inward by means of an incline 296 at the inner end of a slide-bar 297, which by a rod 298, Fig. 27, is suitably connected with the lever 102, located at the left-hand side of the keyboard to be conveniently reached by the operator. The hand-lever 299 is fixed to a rock-shaft 300, extending under the keyboard, and to which the lever 102, which operates the radial lever 101, is attached. When the hand-lever 299 is swung rearward, the slide-bar 297 is moved rearward, and its incline 296 forces the clutch-operating lever 285 to the right or inward, thereby disengaging the clutch-sections, so that motion is not transmitted to the drive-wheel 290 on the main or line shaft, and the latter instantly ceases to rotate.

When the hand-lever 299 is swung outward, the clutch-operating lever 285 is released and the spring 284 at the inner end of the clutch-shaft 283 forces the latter outward, or to the left, to engage the clutch-sections, whereupon motion is transmitted to the drive-wheel on the main or line shaft and the latter will instantly commence to rotate.

The main or line shaft is automatically stopped after each cycle of motions of the machine—that is to say, after the line-carriage has been shifted from the composing to the casting mechanism and has returned to the composing mechanism—through the medium of the dog or pawl 289, which has its finger 294 beveled on its under side to act against the abutment or stud 288 on the clutch-operating lever 285 to force the clutch-shaft 283 inward, and thus separate the clutch-sections, whereby the transmission of power to the main or line shaft ceases and the latter instantly stops. When this occurs, the finger of the dog or pawl lies in engagement with the abutment or stud 288 of the clutch-operating lever, and it is necessary to remove the dog or pawl from such engagement before the clutch-shaft 283 can move outward to engage the clutch-sections and transmit motion to the main or line shaft. To accomplish this result, the operating hand-lever 299 is pushed rearward to force the clutch-operating lever 285 to the right a sufficient distance that the finger 294 of the dog or pawl will, by the slotted construction of the dog and quick action of the spring 295, snap past the abutment or stud 288, and thus offer no obstruction to the instant movement of the main-shaft drive-wheel 290. It will be understood that the operating-lever handle 299 must be moved forward to subsequently start the machine.

The improvements constituting the present invention have been specifically described with reference to the monoline-machine; but it is to be understood that some of the improvements can be successfully used in other types of line-casting machines.

Having thus described my invention, what I claim is—

1. The combination with a magazine having matrix-bar chambers and channels leading therefrom to the front of the magazine, and pins on the front of the latter, of a transparent door vertically hinged to the magazine and constructed to swing open for access to said channels, and a gravitating door-locking slide having oblique slots receiving said pins, and provided with a projection to be struck by the door when it is closed for moving the slide so that the door will pass thereby and the slide then gravitate to locking position, substantially as described.

2. The combination with a matrix-bar magazine having separate chambers for each species of matrix and a delivery-channel arranged substantially at right angles to each matrix-chamber, and an assembling-box below the delivery-point into which the matrix-bars from all the channels are received, of spring-retracted matrix-bar-delivery gates having projecting lugs, pivoted pawls having hooked extremities engaging said lugs to hold the delivery-gates advanced, detent-levers for operating said pivoted pawls to release the delivery-gates, and means for operating the detent-levers, substantially as described.

3. The combination with a magazine having separate chambers for each species of matrix and a delivery-channel extending from each chamber to the point of delivery, and an assembling-box arranged below the delivery-point of said channels, of spring-retracted delivery-gates which support the matrix-bars in the channels, pivoted pawls having hooked extremities engaging the delivery-gates to hold them advanced against the tension of their springs, detent-levers for operating the pawls to disengage them from the delivery-gates, and a finger-key mechanism connected with the detent-levers, substantially as described.

4. The combination with a space-bar magazine-chamber having a delivery-channel, of a space-bar lifter and a space-bar pusher connected together, and a pusher for pressing the space-bar into the delivery-channel when it is raised by the lifter, substantially as described.

5. The combination with a space-bar magazine-chamber having a delivery-channel, of a space-bar lifter, and a spring-pusher moved out of the path of the space-bar by the lifter and serving to press the space-bar into the delivery-channel when it is raised by the said lifter, substantially as described.

6. The combination with a space-bar magazine-chamber having a delivery-channel, of a space-bar lifter and a space-bar pusher connected together, a spring-pusher for pressing the space-bar into the delivery-channel when it is raised by said lifter, and a friction leaf-spring located in the delivery-channel and acting to temporarily arrest and support the space-bar until it is thrust downward by the space-bar pusher, substantially as described.

7. The combination with a space-bar magazine-chamber having a delivery-channel, of an elbow space-bar lever having one arm overhanging the magazine, a vertical slide connected with one end portion of the overhanging arm and provided with a space-bar lifter and a space-bar pusher, and means for operating said lever, substantially as described.

8. The combination with a magazine space-bar chamber having a delivery-channel, of an elbow space-bar lever pivoted at or near its angle to the rear portion of the magazine and having one arm overhanging the latter, a vertical slide loosely connected with the end portion of the overhanging arm and provided with a space-bar-lifting horn and a space-bar-pushing arm, and means for oscillating the lever, substantially as described.

9. The combination with a space-bar magazine-chamber having a delivery-channel, of an elbow space-bar lever pivoted at or near its angle to the rear portion of the magazine and having one arm overhanging the same, a vertical slide loosely connected with the end portion of the overhanging arm and provided with a space-bar-lifting horn and a space-bar-pushing arm, a retaining device for holding the lever with its overhanging arm lifted, means for releasing said retaining device by the action of the space-bar key, and an oscillator which in its forward motion acts on the lever and resets the same, substantially as described.

10. The combination with a space-bar magazine-chamber having a delivery-channel, of an elbow space-bar lever having one arm overhanging the magazine and the other arm extending vertically in rear thereof, a space-bar lifter and pusher connected with the front end portion of the overhanging arm, a detaining dog or pawl for engaging and retaining the vertical arm of the lever to normally hold the lifter and pusher elevated, means for disengaging the dog or pawl from the lever, a spring connected with the lever for throwing the overhanging arm downward when the lever is disengaged from the dog or pawl, and means for resetting the lever in operative connection with the dog or pawl, substantially as described.

11. The combination with a space-bar magazine-chamber having a delivery-channel, of an elbow space-bar lever having one arm overhanging the magazine and the other arm extending vertically in rear thereof, a space-bar lifter and pusher connected with the front end portion of the overhanging arm, a detaining dog or pawl for engaging and retaining the vertical arm of the lever to normally hold the lifter and pusher elevated, a spring connected with the lever for throwing the overhanging arm downward when the lever is released from the dog or pawl, and an oscillator which in its forward motion acts on the vertical arm of the lever to reset the same and raise the lifter and pusher, substantially as described.

12. The combination with a space-bar magazine-chamber having a delivery-channel, of an elbow space-bar lever pivoted at or near its angle to the magazine and having one arm overhanging the latter, a space-bar lifter and pusher connected with the front end portion of the overhanging arm, a spring connected with the lever to throw the overhanging arm downward, a lever-detaining dog or pawl for holding the lever against the tension of the spring, a space-key connected with the dog or pawl, and an oscillator which in its forward motion resets the lever after it is released by the detaining dog or pawl, substantially as described.

13. The combination with a magazine space-bar chamber having a delivery-channel, a slide having means for first lifting and subsequently pushing downward a space-bar, and means for operating said slide, of a spring-pusher for pressing the space-bar into the delivery-channel when raised by the slide, substantially as described.

14. The combination with a magazine having matrix-bar-delivery gates, means for holding the delivery-gates and throwing them rearward when released, and an oscillator which in its forward movements resets the gates, of means for arresting the back stroke of the oscillator, and means for automatically releasing the said arresting means to permit the oscillator to complete its back stroke, substantially as described.

15. The combination with a magazine, matrix-delivery gates, an oscillator, means by which the oscillator is moved rearward, and a rotary cam and roller by which the oscillator is moved forward, of a stop for arresting the rearward stroke of the oscillator after it is moved forward by the cam and roller, and means for automatically operating said stop to release the oscillator and permit it to complete its rearward stroke, substantially as described.

16. The combination with a magazine having matrix-bar-delivery gates, means for holding the delivery-gates to support the matrix-bars and forcing the said gates rearward when released, an oscillator having a rotary cam, and means for operating said cam to throw the oscillator forward, of an arresting device for arresting the back stroke of the oscillator and holding the cam from engagement with its operating means, and means for automatically operating the arresting device to permit the oscillator to complete its back stroke and cause its cam to engage said operating means, substantially as described.

17. The combination with a magazine, matrix-bar-delivery gates, means for holding the delivery-gates advanced to support the matrix-bars, means for moving the delivery-gates rearward when released, and an oscillator which in its forward motions resets the gates, of an arresting device arranged to arrest the back stroke of the oscillator and constructed to be operated by the delivery-gates to release said oscillator, substantially as described.

18. The combination with a magazine, matrix-bar-delivery gates, means for holding the gates advanced to support the matrix-bars, and means for forcing the gates rearward when released, of an oscillator having at its upper portion a series of pivotally-mounted levers which respectively act upon the gates when the oscillator is moved forward for advancing said gates into position to support the matrix-bars, substantially as described.

19. The combination with a magazine, matrix-bar-delivery gates, means for holding the gates advanced to support the matrix-bars, and means for forcing the delivery-gates rearward when released, of an oscillator having at its upper end portion a series of independently-movable spring-pressed lever-arms which respectively act on the delivery-gates to advance them to support the matrix-bars when the oscillator is moved forward, substantially as described.

20. The combination with a magazine, matrix-bar-delivery gates, means for holding the delivery-gates advanced to support the matrix-bars, and means for moving the delivery-gates rearward when they are released, of an oscillator having at its upper portion a plurality of spring-pressed pivotally-mounted lever-arms which respectively act upon the delivery-gates to advance them to support the matrix-bars when the oscillator is thrown forward, and an automatic arresting device which arrests the back stroke of the oscillator and is operated by the delivery-gates, to release said oscillator, and permit it to complete its back stroke, substantially as described.

21. The combination with a magazine having matrix-bar chambers and delivery-channels, matrix-bar-delivery gates, devices which hold the delivery-gates advanced, and a keyboard mechanism for releasing the gate-holding devices, of an oscillator having a rotary cam and provided at its top portion with a series of pivotally-mounted lever-arms which act upon the delivery-gates to advance them when the oscillator is swung forward, an arresting device for arresting the back stroke of the oscillator after it has been moved forward to advance a delivery-gate, means for actuating the arresting device to release the oscillator and permit it to complete its back stroke, and means for operating said cam of the oscillator, substantially as described.

22. The combination with a magazine, of spring-pressed delivery-gates arranged side by side and each having a lug, a pawl for each gate, having a hooked end to engage the lug of the gate, and levers constructed to press against the tail ends of said pawls, substantially as described.

23. The combination of a serrated or toothed roller, and means for rotating the same, with an oscillator having a serrated or toothed cam to engage with and be rotated by the serrated or toothed roller, a magazine, matrix-bar-delivery gates which are advanced to support the matrix-bars by the forward motion of the oscillator, and an arresting device which arrests the back stroke of the oscillator and is operated by the delivery-gates to automatically release said oscillator, substantially as described.

24. The combination with a magazine having matrix-bar chambers and delivery-channels, spring-retracted gates, means for retaining the delivery-gates advanced to support the matrix-bars, and means for releasing the gates, of an oscillator having a rotary cam and provided in its top portion with a series of double-armed spring-pressed levers which respectively act upon the rear ends of the gates to advance the same when the oscillator is moved forward, a stop dog or pawl constructed to arrest the back stroke of the oscillator, and provided with a pendent portion arranged in the path of the delivery-gates for operating the stop dog or pawl to release the oscillator, and means for operating the cam of the oscillator, substantially as described.

25. The combination with a magazine having matrix-bar chambers and delivery-channels, of spring-retracted matrix-bar-delivery gates having the lower portions of their rear ends cut away, an oscillator having a series of independently-acting lever-arms at its upper portion, each of which when a gate is retracted rearward, acts upon the uncut portion of the rear end of the said gate, substantially as described.

26. The combination with the delivery-gates, the oscillator having a rotary cam, and means for operating the cam, of a series of double-armed levers pivotally mounted in the upper portion of the oscillator, springs connected respectively with said double-armed levers, and an arresting device which automatically engages the oscillator and arrests its back stroke after it has been moved forward to reset a delivery-gate, said arresting device being operated when a delivery-gate moves rearward to release the oscillator and permit it to complete its back stroke, substantially as described.

27. The combination with the main or line shaft, and drive-gearing for rotating the same, of the oscillator having a rotary cam, a spindle having a roller to operate said cam and provided with means to drive it independent of the drive-gearing which rotates the main or line shaft, a magazine, matrix-bar-delivery gates held advanced to support the matrix-bars, and means for releasing the gates, substantially as described.

28. The combination with the stop-bars for arresting the matrix-bars, means for advancing the stop-bars, and a yoke for retracting the bars, of an oscillator pivotally mounted intermediate its upper and lower end portions, and a loose connection between the said yoke and the lower end of the oscillator below the pivotal point thereof for retracting the yoke by the rearward motion of the lower end of the oscillator, substantially as described.

29. The combination with a main shaft, drive mechanism therefor, the oscillator having a rotary cam, and the roller for operating said rotary cam, of mechanism disconnected from the drive mechanism of the main shaft, for operating said cam-actuating roller, at the will of the operator, independent of the motion of the main-shaft-driving mechanism, substantially as described.

30. The combination with an assembly-box, a reciprocatory ejector therein, an oscillator, and means for operating said oscillator, of a bell-crank lever having one arm loosely engaged directly with the ejector, and a slide-bar connection between the other arm of the lever and the oscillator, for reciprocating the ejector, substantially as described.

31. The combination with an assembly-box, a reciprocatory ejector therein, an oscillator pivoted between its upper and lower ends, and means for operating said oscillator, of a bell-crank lever having one arm connected with the ejector, and a slide-bar joined to the other arm of said lever and connected with the lower end of the oscillator below its pivotal point, substantially as described.

32. The combination with the assembly-box having opening and closing jaws, and an ejector for opening the jaws and ejecting the matrices, of a bar spanning the box and having spring holding-shoulders by which undue spreading of the jaws is prevented and the jaws are closed when the ejector is retracted, substantially as described.

33. The combination with an assembly-box, and means for introducing the matrix-bars thereinto and ejecting them therefrom, of a line-abutment carriage or slide-block having a spring-projected line-abutment finger, a lock for locking the finger projected, means for releasing the lock, a vibrating lever, means for moving the lever in one direction after the line-abutment finger is released, and a link connection between the carriage or slide-block and the lever, substantially as described.

34. The combination with an assembly-box, and means for introducing the matrix-bars thereinto and ejecting them therefrom, of a line-abutment carriage or slide-block having a spring-projected line-abutment finger, a lock for locking the finger projected, means for releasing the lock, a vibrating lever, means for moving the lever in one direction after the line-abutment finger is released, a link connection between the carriage or slide-block and the lever, and an audible signal operated by the action of said vibrating lever, substantially as described.

35. The combination with an assembly-box, and means for introducing the matrix-bars thereinto and ejecting them therefrom, of a line-abutment carriage or slide-block having a spring-projected line-abutment finger, a lock for locking the finger projected, means for releasing the lock, a vibrating lever, means for moving the lever in one direction after the line-abutment finger is released, a link connection between the carriage or slide-block and the lever, a bell or gong, and a bell hammer or striker operated when the line is approximately of the required length, substantially as described.

36. The combination with a magazine, of a movable line-abutment carriage, an angular spring-projected line-abutment finger pivoted to the carriage, a device for locking said finger projected, means for actuating said locking device to release the finger, a spring-actuated vibrating lever, and a connection between said lever and the line-abutment carriage, substantially as described.

37. The combination with a sliding line-abutment carriage, of an angular line-abutment finger pivoted at one extremity thereto, a spring acting on one end of the finger to project the same, a pivoted dog for locking the finger projected, means for swinging the dog to release the finger, a spring-actuated vibratory lever, and a connection between the lever and the said carriage, substantially as described.

38. The combination with a magazine for containing matrix-bars, and an assembling-box, of a carriage or slide having a yielding line-abutment, means for holding and releasing the abutment, a spring-actuated vibratory lever for restoring the carriage to normal position after the line-abutment is released, and a connection between the lever and the carriage, substantially as described.

39. The combination with a magazine for containing matrix-bars, and an assembling-box, of a carriage or slide having a yielding line-abutment, means for holding and releasing the line-abutment, a spring-actuated vibratory lever for restoring the carriage to normal position after the abutment is released and yields inwardly, and audible-signal devices operated by the said vibratory lever for indicating when the line-abutment has nearly reached the point required for producing a line of the necessary length, substantially as described.

40. The combination with the line-carriage having a wing which swings vertically into and out of the line-raceway, of a spring-bolt mounted on a part of the line-carriage and springing into engagement with the wing when it is raised into the line-raceway, a bolt-actuating lever arranged on the carriage and connected with the bolt, and a device in the path of the said lever for retracting the bolt to unlock the wing as the line-carriage is shifted toward the assembly-point, substantially as described.

41. The combination with a line-carriage, means for assembling a line of matrix-bars, a casting mechanism, a primary line-releasing mechanism, and a distributing mechanism, of a secondary line-releasing mechanism by which the line is released as the line-carriage moves from the casting-point to the distributer, substantially as described.

42. The combination with an assembling or composing mechanism, a line-carriage, a casting mechanism, a line-depressor, and a distributer, of two line-releasing mechanisms, one operating to release the line in proper relation to the depressor and the other to release the line in proper relation to the distributer, substantially as described.

43. The combination with the line-depressor, and the distributer, of a line-casting machine, of a traveling line-carriage, and primary and secondary line-releasing mechanisms for releasing the line at two different points in the travel of the line-carriage, substantially as described.

44. The combination with a line-carriage having devices between which the line of matrix-bars is seized, a slide movable vertically on the line-carriage and provided with projecting studs, means operated by the motion of the slide for expanding the line-carriage to release the line, a transversely-movable dog for raising the slide, and a pivoted dog or pawl mounted on the front of the machine and acting on one of said studs to raise said slide and thus effect a second release of the line as the line-carriage is restored to normal position, substantially as described.

45. The combination with a distributer, and a main or primary line-depressor, of a safety or secondary line-depressor, and means for advancing and retracting the safety or secondary line-depressor, substantially as described.

46. The combination with a distributer, and a main or primary line-depressor, of a safety or secondary line-depressor for insuring the correct depression of all the matrix-bars in the line after the main or primary line-depressor has acted, substantially as described.

47. The combination with a distributer, and a main or primary line-depressor, of a safety or secondary line-depressor arranged in the path of the line of matrices to insure their correct depression as the line moves from the main or primary line-depressor toward the distributer, substantially as described.

48. The combination with a distributer, a main or primary line-depressor, a casting-pot, a movable mold-carrying frame, and a mold mounted in said frame, of a safety or secondary line-depressor mounted on the movable mold-carrying frame and advanced and retracted by the movements thereof, substantially as described.

49. The combination with a distributer, a main or primary line-depressor, a casting-pot, a movable mold-carrying frame, and a mold mounted in said frame, of a safety or secondary line-depressor consisting of a plate secured to the mold-carrying frame and having a beveled under side, for insuring the correct depression of all the matrix-bars in the line as the latter moves from the main or primary line-depressor toward the distributer, substantially as described.

50. The combination with the distributer-levers carrying horizontal distributing rods or wires, of mechanism for raising and lowering the outer ends of the distributer-levers and constructed to release the levers and permit loose motion or play of the distributing-wires between their highest and lowest positions, to avoid clamping or holding the matrix-bars as they are elevated, substantially as described.

51. The combination with the distributer-levers carrying the distributing rods or wires, and mechanism for raising and lowering the outer ends of the levers and the distributing-wires, of devices constructed to slightly release the levers and permit a limited loose motion or play of the distributing-wires between their highest and lowest positions to avoid clamping or gripping the matrix-bars, as the rods or wires rise to the distribution-point, substantially as described.

52. The combination with the pivoted distributer-levers carrying the horizontal distributing rods or wires and provided with tail ends having studs, a vertically-movable slide-bar for raising and lowering the outer ends of the levers, and release-blocks mounted on the slide-bar and having cut-away portions for releasing the tail ends of the levers as the distributing-wires rise to the point of distribution for the purpose of preventing the distributing rods or wires clamping or gripping the matrix-bars as they are moving to the distributing-point, substantially as described.

53. The combination with the pivoted distributer-levers having tail ends provided with roller-studs and carrying at their outer ends the distributing rods or wires, a vertically-movable slide-bar for raising and lowering the outer ends of the levers, and means for operating the slide-bar, of lever-release blocks fixed in the slide-bar and constructed with release-surfaces by which the tail ends of the levers are released between the highest and lowest positions of the distributing rods or wires, substantially as described.

54. The combination with the casting-pot, of a line-casting machine, of the well suspended in the pot and having a bottom wall bodily elevated some distance above and separated from the bottom wall of the pot, said well having the metal-delivery channel or throat, whereby a body of molten metal will lie in the pot between the bottom wall of the latter and the bottom wall of the well, substantially as described.

55. The combination with the mold, and the pot-jacket, of a casting-pot suspended in the jacket, and means for adjusting the pot in the jacket in two planes at right angles to each other, substantially as described.

56. The combination with the mold, and the pot-jacket, of the casting-pot suspended in the jacket, and screws for adjusting the pot in the jacket in two planes at right angles to each other, substantially as described.

57. The combination with a movable justifying-shoe, a casting-pot, and a mold, of a pot cut-off plate, and devices actuated by the justifying-shoe when it unduly rises, due to the presence of a loose line, to move said cut-off plate into position to close the mouth of the casting-pot, substantially as described.

58. The combination with a justifying mechanism, a casting-pot, and a mold, of a pot cut-off mechanism operated by the justifying mechanism to close the mouth of the pot when the justifying mechanism unduly moves due to the presence of a loose line, substantially as described.

59. The combination with a justifying-shoe, a casting-pot, and a mold, of a pot cut-off arranged to close the mouth of the casting-pot, a spring-actuated lever connected with the pot cut-off, a bell-crank lever connected with the said lever for operating the same when the justifying-shoe unduly rises due to the presence of a loose line, a trip-pawl with which one arm of the bell-crank lever engages, and audible-signal devices operated by said trip-pawl, substantially as described.

60. The combination with the movable justifying-shoe, casting-pot, and mold, of a line-casting machine, of a pot cut-off arranged to close the mouth of the casting-pot, a loose-line signal, and devices operated by the undue movement of the justifying-shoe, incident to the presence of a loose line, for moving the pot cut-off to close the mouth of the pot and for operating the loose-line signal, substantially as described.

61. The combination with the justifying mechanism, casting-pot, and mold, of a line-casting machine, of an arm or dog mounted on a movable part of the justifying mechanism, a bell-crank lever constructed to be operated by said arm or dog, a trip-pawl engaged with an arm of the bell-crank lever, a vibratory lever actuated in one direction by said bell-crank lever, a pot cut-off plate arranged to move and close the mouth of the casting-pot, and a connection between the pot cut-off plate and said vibratory lever, substantially as described.

62. The combination with the casting-pot, the mold, and the justifying mechanism, of a line-casting machine, of an arm or dog on a movable part of the justifying mechanism, a bell-crank lever constructed to be operated by the arm or dog, a spring-actuated trip-pawl with which an arm of said lever engages, a rock-shaft having a tappet and a bell hammer or striker, a bell or gong, a vibrating lever moved in one direction by said bell-crank lever, a pot cut-off plate arranged to move and close the mouth of the casting-pot, and a connection between the pot cut-off plate and the vibrating lever, substantially as described.

63. The combination with the casting-pot, the mold, and the justifying mechanism, of a line-casting machine, of an automatic pot cut-off constructed and arranged to close the mouth of the casting-pot and actuated by a part of the justifying mechanism when a loose line is present, substantially as described.

64. The combination with a casting-pot, a mold, a justifying mechanism and a line-carriage, of a pot cut-off and a loose-line signal both operated when a loose line is present in the line-carriage, said pot cut-off being constructed and arranged to close the mouth of the casting-pot, substantially as described.

65. The combination with the casting-pot, mold, assembly mechanism, and traveling line-carriage, of a line-casting machine, of a main shaft having a cam-sleeve for operating the line-carriage, and means actuated by the operator for throwing the cam-sleeve out of operative connection with the main shaft, whereby any desired number of printing-bars can be cast from one and the same line of assembled matrices while the line-carriage remains motionless, substantially as described.

66. The combination with a casting-machine, a line-carriage, and a line-carriage lever, of a main or line shaft having a cam-sleeve thereupon and constructed to actuate the line-carriage lever to shift the line-carriage, and devices thrown into action by the operator to disconnect the cam-sleeve from the main or line shaft and permit the line-carriage to remain motionless at the casting mechanism, for the purpose of recasting any desired number of printing-bars from one and the same line of matrices, substantially as described.

67. The combination with a line-carriage, a casting-pot, and a mold, of a main or line shaft having a cam-sleeve thereupon for actuating the line-carriage, a notched collar rigid on the main or line shaft, a slidable locking-bar which normally engages the notched collar, and mechanism under control of the operator for disengaging the locking-bar from the notched collar for recasting purposes, substantially as described.

68. The combination with a main or line shaft, of a cam-sleeve mounted on the shaft, a notched collar rigid on the shaft, a locking-bar movable on the cam-sleeve and constructed to engage the notch in the rigid collar, an arm having an incline for pressing the locking-bar out of engagement with the notched collar, and means for swinging the said arm into and out of the path of the locking-bar, substantially as described.

69. The combination with a movable casting-pot, and a movable mold-frame, of a mold shiftable longitudinally on the mold-frame, and a connection between a part of the casting-pot and the mold-frame, for directly operating the latter from the pot, substantially as described.

70. The combination with a movable casting-pot, a pivoted swinging mold-frame, and a mold slidable longitudinally in the mold-frame, of a pivoted connection between a part of the pot and the pivoted mold-frame, substantially as described.

71. The combination with a movable casting-pot having a lateral projection, a pivoted swinging mold-frame having an attached projecting bracket, and a mold mounted in the mold-frame, of a link pivotally connecting the bracket of the mold-frame with the lateral projection of the casting-pot, substantially as described.

72. The combination with a trimmer, a printing-bar ejector, a sliding casting-pot, a pivoted swinging mold-frame, and a mold slidable in the mold-frame from the pot to the ejector and conversely, of a connection between the pot and the pivoted mold-frame, substantially as described.

73. The combination with trimming-knives, a mold-frame, and a sliding mold mounted in the mold-frame, of a traveling, pivotally-mounted knife-wiper, substantially as described.

74. The combination with trimming-knives, a mold-frame, and a mold sliding in the latter, of a longitudinally-movable wiper-arm, and means for raising the lower end of the wiper-arm as it moves in one direction, substantially as described.

75. The combination with trimming-knives, a mold-frame, and a mold carried by the latter, of a pivoted wiper-arm normally standing substantially vertical, and means for swinging the wiper-arm to an inclined position as it moves in one direction and holding it substantially vertical when it moves in the opposite direction, substantially as described.

76. The combination with a printing-bar trimmer, and a printing-bar ejector, of a shifting mold, a pivoted wiper-arm normally standing substantially vertical, a spring-pressed pin carried by the wiper-arm, and a guide-rail constructed to act on the pin when the wiper moves in one direction to raise the lower end thereof, and having means to press the pin outward as the wiper-arm moves in the opposite direction, to enable the pin to resume normal position for a subsequent operation, substantially as described.

77. The combination with a printing-bar trimmer, a printing-bar ejector, a mold-frame, and a mold shiftable in the frame, of a wiper-arm, and means acting on the wiper-arm for raising its lower end to clear the printing-bar trimmer when the wiper-arm moves in one direction, substantially as described.

78. The combination with a printing-bar trimmer, a printing-bar ejector, and a shifting mold, of a movable carrier provided with a movable wiper-arm, means for moving the mold and the carrier back and forth, and means for raising and lowering the wiper-arm, substantially as described.

79. The combination with a printing-bar trimmer, a printing-bar ejector, a mold-frame, and a mold shiftable in the mold-frame, of a wiper-carrying slide, means for moving the slide back and forth, a wiper-arm movably mounted on the slide, and means for raising and lowering the wiper-arm, substantially as described.

80. The combination with a printing-bar trimmer, and a printing-bar ejector, of a wiper-carrier movable longitudinally of the machine, a wiper-arm pivotally mounted on the carrier, a spring-pressed pin connected with the wiper-arm, and a guide-rail having an incline to act on the pin to tip the wiper-arm as the mold moves in one direction, and a bevel to press the pin outward as the mold moves in the opposite direction, substantially as described.

81. The combination with a printing-bar trimmer, a printing-bar ejector, a mold-frame, and a mold shiftable in the latter, of a guide-rod carried by the mold-frame, a wiper-arm carrier slidable on the guide-rod, a spring-actuated wiper-arm pivoted to said carrier, a spring-pressed pin connected with the wiper-arm, and a guide-rail having an incline and a bevel, the incline operating on the pin to tip the wiper-arm as the mold moves in one direction and the bevel acting to press the pin outward as the mold moves in the opposite direction, substantially as described.

82. The combination with the movable mold-carrying frame, and the mold slidable longitudinally in said frame, of a lever pivoted between its ends at the upper side of the bed-plate, a cam engaging one end of said lever, and a link connecting the other end of said lever with the mold for sliding the latter longitudinally, substantially as described.

83. The combination with a horizontally-sliding mold, and a horizontally-sliding wiper-carrier, of a lever pivoted between its ends at the upper side of the bed-plate of the machine, a cam engaging one end of the lever, and connections between the other end of the lever and the mold and the wiper-carrier, whereby the one lever serves to slide both the mold and the wiper-carrier, substantially as described.

84. The combination with a bracket or shelf projecting from the front of the machine and provided with a spring-pressed locking-pin, of a galley-box detachably mounted on said bracket or shelf and locked in position thereupon by said locking-pin, a sliding block moving in the galley-box, a rock-shaft having an attached upwardly-projecting finger, an arm on the rock-shaft, and a sliding mold provided with a device for acting on said arm to rock the shaft and thereby vibrate said finger, substantially as described.

85. The combination with a galley-box mounted on the machine, of a vibrating finger, a horizontally-sliding mold, and devices operated by said sliding mold to vibrate said finger, substantially as described.

86. The combination with a galley-box supported at the front of the machine, and devices for detachably holding the galley-box in position, of a vibrating finger, a rock-shaft with which said finger is connected, a horizontally-sliding mold, and devices operated by said mold for rocking said shaft and thereby vibrating said finger, substantially as described.

87. The combination with a galley-box supported at the front of the machine, of a vibrating finger, a rock-shaft with which said finger is connected, a rigid tappet-arm secured to said rock-shaft, a horizontally-sliding mold carrying a tappet-dog for acting on the rigid tappet-arm to move it in one direction, and a spring for moving said tappet-arm in the opposite direction, whereby the rock-shaft is rocked and the finger is vibrated, substantially as described.

88. The combination with a bracket or shelf at the front of the machine, and a galley-box detachably mounted on said bracket or shelf and constructed with a longitudinal slot in its bottom wall, of a finger working in the slot of the galley-box, a rock-shaft to which said finger is attached, a tappet-arm secured to the rock-shaft, and a horizontally-sliding mold carrying a device which acts upon the tappet-arm to turn the rock-shaft and swing the vibrating finger, substantially as described.

89. The combination with a bracket or shelf arranged at the front of the machine and provided with a leaf-spring attached at one end and having a locking-pin at the opposite end, of a galley-box supported by said bracket or shelf and detachably held thereupon by said locking-pin, a vibrating finger, a rock-shaft to which said finger is attached, a movable mold, and devices for rocking the rock-shaft to vibrate the finger, substantially as described.

90. The combination with the main shaft, having a drive-wheel, a drive-gearing, a clutch between the drive-gearing and the drive-wheel on the main shaft, a clutch-shaft, and a lever for moving the clutch-shaft to operate the clutch, of a spring-actuated dog or pawl pivotally mounted on the drive-wheel of the main shaft and serving to operate the lever to move the clutch and automatically stop the main shaft, and means for subsequently moving said lever to permit the dog or pawl to snap or spring past said lever for restarting the main shaft, substantially as described.

91. The combination with a main shaft having a drive-wheel, a drive-gearing, a clutch, and a clutch-operating lever, of a spring-actuated dog or pawl pivotally mounted on the drive-wheel of the main shaft, substantially as described.

92. The combination of a main shaft having a drive-wheel, drive-gearing, a clutch for connecting the drive-gearing with the drive-wheel of the main shaft, a lever for operating the clutch, means under control of the operator for actuating the clutch-operating lever, and a spring-actuated dog or pawl pivotally mounted on said drive-wheel of the main shaft, to automatically stop the main shaft, substantially as described.

93. The combination with the main shaft having a drive-wheel, a clutch mechanism, and a clutch-operating lever, of a spring-actuated dog or pawl pivotally mounted on the drive-wheel of the main shaft and provided with a projecting beveled finger for automatically operating the clutch-operating lever, substantially as described.

94. The combination with a main shaft having a drive-wheel, driving mechanism having a clutch, a spring-pressed clutch-shaft, a pivoted lever for pressing the clutch-shaft inward, a sliding bar for operating said lever, and means for moving the sliding bar at the will of the operator, of a spring-actuated dog or pawl pivoted on the drive-wheel and having a segmental slot and a beveled finger constructed to automatically operate the lever, and a guide-pin passing through the slot of the dog or pawl into the drive-wheel, substantially as described.

In testimony whereof I have hereunto set my hand this 28th day of September, 1897.

WILBUR STEPHEN SCUDDER.

Witnesses:
   E. L. CHADWICK,
   E. VAYMENT.